(12) United States Patent
Miyazaki

(10) Patent No.: US 8,234,311 B2
(45) Date of Patent: Jul. 31, 2012

(54) INFORMATION PROCESSING DEVICE, IMPORTANCE CALCULATION METHOD, AND PROGRAM

(75) Inventor: Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/029,775

(22) Filed: Feb. 17, 2011

(65) Prior Publication Data

US 2011/0208750 A1 Aug. 25, 2011

(30) Foreign Application Priority Data

Feb. 23, 2010 (JP) .................................. 2010-037469

(51) Int. Cl.
*G06F 17/30* (2006.01)
(52) U.S. Cl. ....................................................... 707/802
(58) Field of Classification Search .................... 707/802
See application file for complete search history.

(56) References Cited

U.S. PATENT DOCUMENTS 5,734,890 A * 3/1998 Case et al. ............................. 1/1
2011/0252031 A1* 10/2011 Blumenthal et al. .......... 707/733

FOREIGN PATENT DOCUMENTS

| JP | 9 325969 | 12/1997 |
| JP | 2007 200339 | 8/2007 |
| JP | 2007 323315 | 12/2007 |

* cited by examiner

*Primary Examiner* — Cheryl Lewis
(74) *Attorney, Agent, or Firm* — Frommer Lawrence & Haug LLP; William S. Frommer

(57) ABSTRACT

There is provided an information processing device including: a storage unit that has an attribute table storing attribute values given to a plurality of contents; and an importance calculation unit that calculates an importance to a specific attribute of content with respect to one or more attributes other than the specific attribute of content using attribute values stored in the attribute table, wherein the importance calculation unit calculates the importance using a decision table with the specific attribute as a decision attribute and the one or more attributes as condition attributes.

13 Claims, 19 Drawing Sheets

FIG.2

ATTRIBUTE TABLE

| CONTENT | BASIC ATTRIBUTE | | EXTENDED ATTRIBUTE | EVALUATION ATTRIBUTE |
|---|---|---|---|---|
| | METADATA | CONTEXT | | |
| C1 | (ATTRIBUTE VALUE) | | | |
| C2 | | | | |
| : | | | | |

FIG.3

| CONTENT | BASIC ATTRIBUTE | | | | | | | | | | | | | | |
|---|---|---|---|---|---|---|---|---|---|---|---|---|---|---|---|
| | METADATA | | | | | | | | | | | | | | |
| | GENRE | | | AGE | | | MOOD | | | KEYWORD | | | ARTIST | | |
| | G1 Rock | G2 Pop | ... | E1 '70s | E2 '80s | ... | M1 | M2 | ... | K1 | K2 | ... | A1 | A2 | ... |
| C1 | 1.0 | 0.0 | ... | 1.0 | 0.0 | ... | 1.0 | 0.0 | ... | 1 | 0 | ... | 1 | 0 | ... |
| C2 | 0.0 | 1.0 | ... | 0.0 | 1.0 | ... | 0.0 | 1.0 | ... | 0 | 1 | ... | 0 | 1 | ... |
| .. | .. | .. | .. | .. | .. | .. | .. | .. | .. | .. | .. | .. | .. | .. | .. |

FIG.4

| CONTENT | BASIC ATTRIBUTE | | | | | |
| --- | --- | --- | --- | --- | --- | --- |
| | CONTEXT DATA | | | | | |
| | TIME PERIOD | | | PLACE | | |
| | T1 10-12 | T2 12-14 | ... | P1 Tokyo | P2 Osaka | ... |
| C1 | 2 | 10 | ... | 8 | 4 | ... |
| C2 | 3 | 1 | ... | 0 | 4 | ... |
| : | : | : | ... | : | : | ... |

FIG.5

| CONTENT | EXTENDED ATTRIBUTE | | | | | |
| --- | --- | --- | --- | --- | --- | --- |
| | REVIEW LAYER | | | PERSON LAYER | | |
| | X1 | ... | Xm | Y1 | ... | Ym |
| C1 | 0.5 | ... | 0.2 | 0.5 | ... | 0.2 |
| C2 | 0.1 | ... | 0.2 | 0.7 | ... | 0.1 |
| : | : | ... | : | : | ... | : |

| CONTENT | KEYWORD | | | | | |
|---|---|---|---|---|---|---|
| | K1 scandal | K2 album | K3 popularity | K4 record | K5 ability | ... |
| C1 | 1 | 0 | 2 | 0 | 1 | ... |
| C2 | 0 | 1 | 0 | 2 | 1 | ... |
| C3 | 3 | 0 | 1 | 1 | 0 | ... |
| : | : | : | : | : | : | : |

PROBABILISTIC CLASSIFICATION (e.g.PLSA, LDA)

| CONTENT | REVIEW LAYER | | | |
|---|---|---|---|---|
| | X1 | X2 | ... | Xn |
| C1 | 0.4 | 0.1 | ... | 0.3 |
| C2 | 0.1 | 0.2 | ... | 0.1 |
| C3 | 0.6 | 0.1 | ... | 0.1 |
| : | : | : | : | : |

← LATENT TOPIC

↑ PROBABILITY OF BELONGING (X1)

↑ PROBABILITY OF BELONGING (X2)

FIG.10

| CONDITION ATTRIBUTE SET | CONDITION ATTRIBUTE C | | | | IMPORTANCE (Q=LIKING) |
|---|---|---|---|---|---|
| | GENRE | AGE | KEYWORD "WORLD" | MOOD CHEERFUL | |
| AS1 | p | | | | 0.40 |
| AS2 | | p | | | 0.20 |
| AS3 | | | p | | 0.05 |
| AS4 | | | | p | 0.25 |
| AS5 | p | p | | | 0.50 |
| AS6 | p | | p | | 0.35 |
| AS7 | p | | | p | 0.55 ← MAX |
| ⋮ | ⋮ | ⋮ | ⋮ | ⋮ | ⋮ |
| AS14 | | p | p | p | 0.25 |
| AS15 | p | p | p | p | 0.30 | p: CONDITION ATTRIBUTE INCLUDED IN ATTRIBUTE SUBSET P

| CONTENT | CONDITION ATTRIBUTE C ||||  DECISION ATTRIBUTE Q |
|---|---|---|---|---|---|
|  | GENRE | AGE | KEYWORD "WORLD" | MOOD CHEERFUL | CONTEXT |
|  |  |  |  |  | TIME PERIOD:T1 |
| C1 | Rock | '80s | 1 | High | 2 |
| C2 | Rock | '70s | 1 | Middle | 3 |
| C3 | Jazz | '70s | 0 | Low | 4 |
| : | : | : | : | : | : |

| CONDITION ATTRIBUTE SET | GENRE | AGE | KEYWORD "WORLD" | MOOD CHEERFUL | IMPORTANCE |
|---|---|---|---|---|---|
| AS1 | p |  |  |  | 0.05 |
| AS2 |  | p |  |  | 0.20 |
| AS3 |  |  | p |  | 0.05 |
| AS4 |  |  |  | p | 0.25 |
| AS5 | p | p |  |  | 0.65 ← MAX |
| AS6 | p |  | p |  | 0.35 |
| AS7 | p |  |  | p | 0.30 |
| : | : | : | : | : | : |
| AS14 |  | p | p | p | 0.25 |
| AS15 | p | p | p | p | 0.25 | p: CONDITION ATTRIBUTE INCLUDED IN ATTRIBUTE SUBSET P

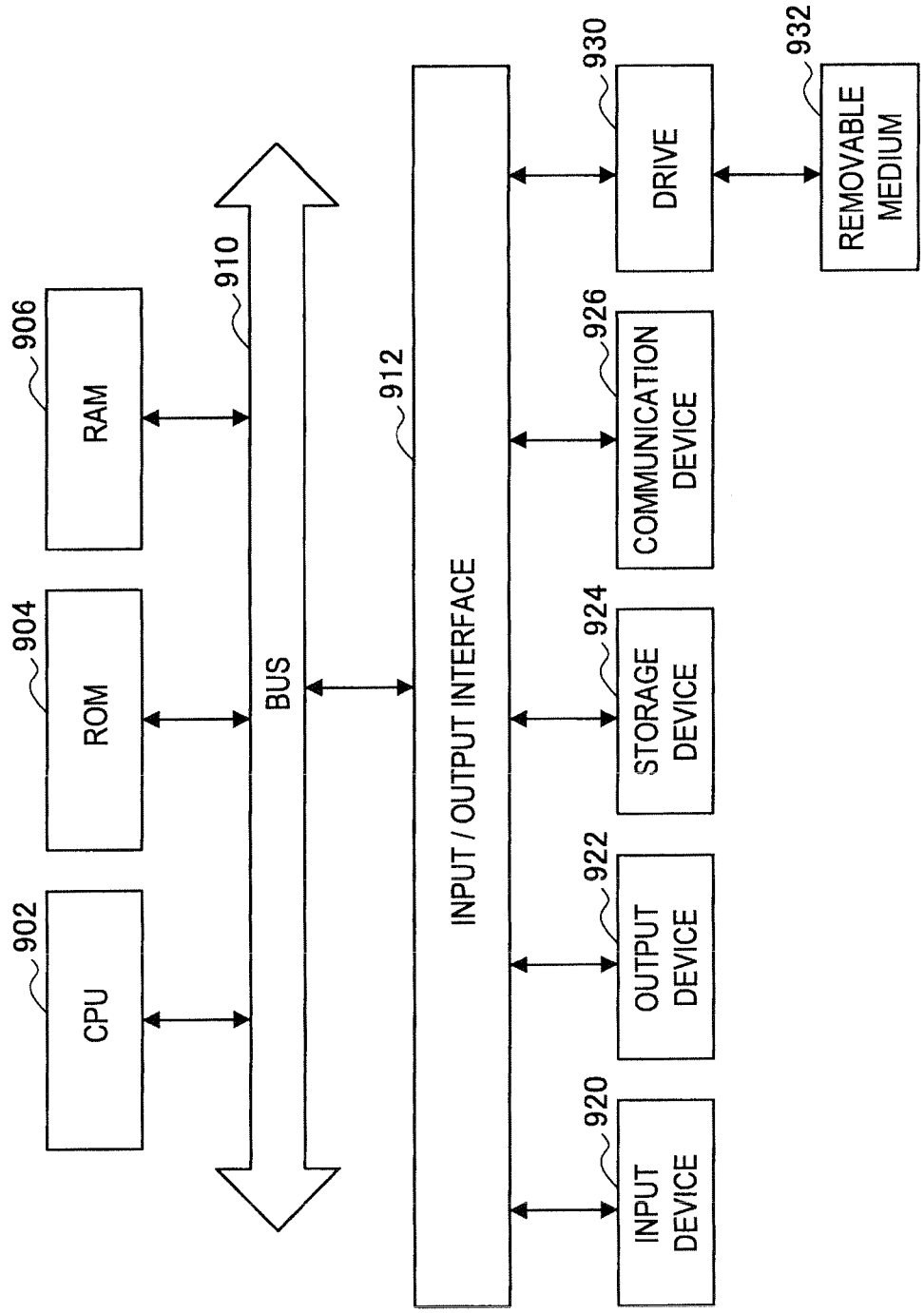

INFORMATION PROCESSING DEVICE, IMPORTANCE CALCULATION METHOD, AND PROGRAM

BACKGROUND OF THE INVENTION

1. Field of the Invention

The present invention relates to an information processing device, an importance calculation method, and a program.

2. Description of the Related Art

With recent development of information and communications technology, various kinds of contents such as music, videos, electronic book, news articles, product information or event information are provided to users over a network. It is, however, not easy for an individual user to find suitable information from such enormous contents. Therefore, search services such as keyword search or genre search that support a user to find a content, recommendation services that recommend a content suitable for a user by a system and so on are provided. For example, Japanese Unexamined Patent Application Publication No. 2007-323315 describes a technique called collaborative filtering adopted to many content recommendation services. Further, Japanese Unexamined Patent Application Publication No. 2007-200339 describes a technique that decides a TV program to be recommended by using matching based on a vector space model.

In the above-described content search services, content recommendation services and other content-related services, a key factor determining the effectiveness of a service is handling of attributes of a content. Generally, the attributes of a content include different kinds such as an attribute artificially given to the content, an attribute generated by analyzing content data, and an attribute calculated based on a user action on the content. At present, not only the number of contents provided to a user but also the variety of attributes of contents to be handled in services is increasing. Consequently, a technique of efficiently extracting an attribute important for classification, search or recommendation of a content from attributes of the content attracts attention. For example, Japanese Unexamined Patent Application Publication No. H9-325969 describes an example of the technique for extracting an important attribute from a plurality of attributes for data classified into categories.

SUMMARY OF THE INVENTION

However, in the technique described in Japanese Unexamined Patent Application Publication No. H9-325969, an importance is determined for each individual attribute, and it is unable to recognize an importance as to a combination of attributes relevant to each other. For example, "genre" and "age" are among examples of attributes of a music content. Attribute values for "genre" are "rock", "pop", "classic" and so on. Attribute values for "age" are "1970s", "1980s", "1990s" and so on. In such an instance, even with the same "genre" (e.g. "rock"), it often has different meanings for users depending on in which "age" of "rock" it is. Specifically, if importances as to various combinations of attributes can be flexibly evaluated from a large number of attributes of a content, it is expected to utilize the importance for a variety of applications, such as presenting a reason for recommendation of the content or giving a genre for content search.

In light of the foregoing, it is desirable to provide novel and improved information processing device, importance calculation method and program capable of flexibly evaluating importances as to various combinations of attributes of a content.

According to an embodiment of the present invention, there is provided an information processing device including: a storage unit that has an attribute table storing attribute values given to a plurality of contents; and an importance calculation unit that calculates an importance to a specific attribute of content with respect to one or more attributes other than the specific attribute of content using attribute values stored in the attribute table, wherein the importance calculation unit calculates the importance using a decision table with the specific attribute as a decision attribute and the one or more attributes as condition attributes.

In this configuration, an importance to the specific attribute can be calculated for various combinations using the decision table with the one or more attributes as a set of condition attributes.

The importance calculation unit may calculate the importance based on the number of contents forming a positive region of the decision attribute for the decision table.

The information processing device may further include an extraction unit that extracts one or more important attributes to be used for generating information related to the content and to be presented to a user according to the importance calculated by the importance calculation unit.

The information processing device may further include a recommendation unit that selects a content to be recommended to a user by using attribute values stored in the attribute table and generates a reason for recommendation based on the one or more important attributes extracted by the extraction unit.

The recommendation unit may store a score for each content calculated for selection of a content into the attribute table, and the extraction unit may extract the one or more important attributes according to the importance calculated by the importance calculation unit using the score as decision attribute.

The attribute table may further store attribute values of a feedback attribute given based on user feedback for each content, the recommendation unit may select a content to be recommended to a user by using attribute values of the feedback attribute, and the extraction unit may extract the one or more important attributes according to the importance calculated by the importance calculation unit using the feedback attribute as decision attribute.

The attribute table may further store attribute values of a context attribute given based on a state of a user action for each content, the recommendation unit may select a content to be recommended to a user by using attribute values of the context attribute, and the extraction unit may extract the one or more important attributes according to the importance calculated by the importance calculation unit using the context attribute as decision attribute.

The attribute table may store attribute values of basic attributes given to a plurality of contents as well as attribute values of extended attributes obtained by analyzing attribute values of the basic attributes.

The extraction unit may extract the one or more important attributes according to a first importance calculated by the importance calculation unit using the specific attribute as decision attribute and one or more attributes included in the extended attributes as condition attributes and a second importance calculated by the importance calculation unit using the attribute included in the extended attributes as decision attribute and one or more attributes included in the basic attributes as condition attributes.

The information processing device may further include an analysis unit that calculates attribute values of the extended attributes based on attribute values of the basic attributes according to probabilistic classification by PLSA (Probabilistic Latent Semantic Analysis) or LDA (Latent Dirichlet Allocation).

The information processing device may further include a content list generation unit that generates a list of contents to be reproduced using attribute values stored in the attribute table and generates a title of a content list based on the one or more important attributes extracted by the extraction unit, wherein the extraction unit may extract the one or more important attributes according to the importance calculated by the importance calculation unit using an attribute used for generation of the content list by the content list generation unit as decision attribute.

The information processing device may further include a content list generation unit that generates a list of contents to be reproduced according to user designation and generates a title of a content list based on the one or more important attributes extracted by the extraction unit, wherein the extraction unit may extract the one or more important attributes according to the importance calculated by the importance calculation unit using an attribute having an attribute value determined depending on presence or absence of user designation as decision attribute.

The storage unit may further contain history data indicating a history of user actions for a plurality of contents, and the importance calculation unit may calculate the importance as to the one or more attributes for each user by using attribute values of contents included in the history data.

The importance calculation unit may derive a positive region of the decision attribute in the decision table according to a rough sets theory.

According to another embodiment of the present invention, there is provided an importance calculation method in an information processing device having an attribute table storing attribute values given to a plurality of contents using a storage medium, the method including a step of: calculating an importance to a specific attribute of content with respect to one or more attributes other than the specific attribute of content using attribute values stored in the attribute table, wherein the importance is calculated using a decision table with the specific attribute as a decision attribute and the one or more attributes as condition attributes.

According to an embodiment of the present invention, there is provided a program causing a computer that controls an information processing device having an attribute table storing attribute values given to a plurality of contents using a storage medium to function as: an importance calculation unit that calculates an importance to a specific attribute of content with respect to one or more attributes other than the specific attribute of content using attribute values stored in the attribute table, wherein the importance calculation unit calculates the importance using a decision table with the specific attribute as a decision attribute and the one or more attributes as condition attributes.

According to the embodiments of the present invention described above, it is possible to provide the information processing device, importance calculation method and program capable of flexibly evaluating importances as to various combinations of attributes of a content.

BRIEF DESCRIPTION OF THE DRAWINGS

FIG. 2 is an explanatory view to explain an overview of an attribute table according to one embodiment;
FIG. 3 is an explanatory view to explain an example of metadata as basic attributes stored in the attribute table;
FIG. 4 is an explanatory view to explain an example of context data as basic attributes stored in the attribute table;
FIG. 5 is an explanatory view to explain an overview of extended attributes stored in the attribute table;
FIG. 10 is an explanatory view to explain an example of importances calculated based on the decision table;
FIG. 19 is a block diagram showing an example of a hardware configuration.

DETAILED DESCRIPTION OF THE EMBODIMENT(S)

Figure 1:
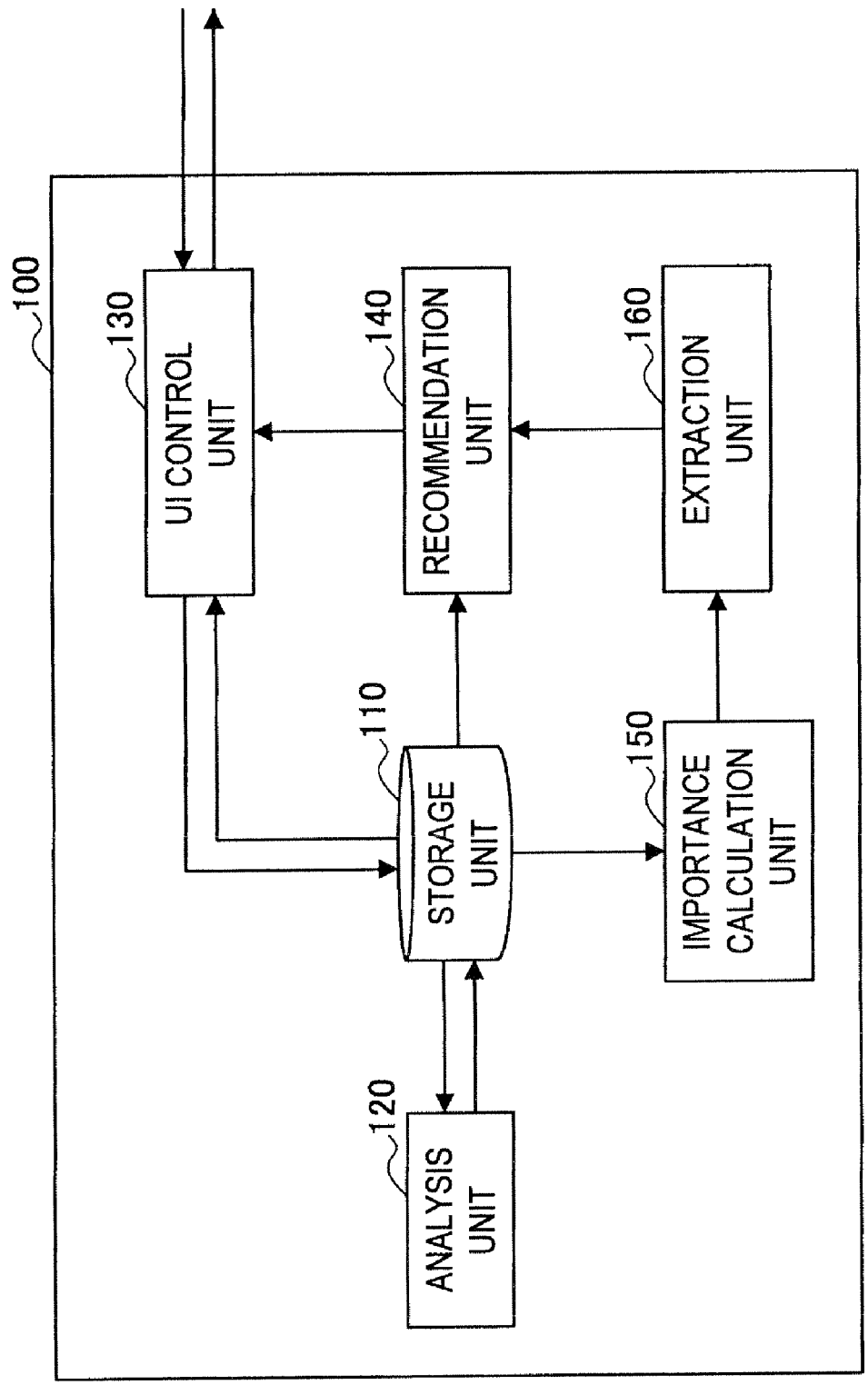
FIG. 1 is a block diagram showing a configuration of an information processing device according to one embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Description of Terms
2. Exemplary Configuration of Information Processing Device According to One Embodiment
   2-1. Attribute Table
   2-2. Storage Unit
   2-3. Analysis Unit
   2-4. User Interface Control Unit
   2-5. Recommendation Unit
   2-6. Importance Calculation Unit
   2-7. Extraction Unit
   2-8. Example of Screen
3. Flow of Process According to One Embodiment
   3-1. Preprocess
   3-2. Recommendation Process 4. Alternative Examples
4-1. Provision of Playlist
4-2. Personalization
5. Exemplary Hardware Configuration
6. Summary <1. Description of Terms>

Description of principal terms used in this specification is as follows.

Probabilistic classification: One of techniques to classify elements of a set of contents or texts into subsets. In the probabilistic classification, one content or text can belong to a plurality of subsets with some probability.

Latent topic: Concept which corresponds to each subset in the probabilistic classification and potentially contributes to occurrence of each content or text. Can be considered to express a field, topic or the like of each subset.

PLSA (Probabilistic Latent Semantic Analysis): One of the probabilistic classification. Provides a probabilistic generative model by the latent topic and widely used in the field of text classification.

LDA (Latent Dirichlet Allocation): One of the probabilistic classification which is an extension of PLSA. Provides a probabilistic generative model by the latent topic and widely used in the field of text classification.

Topic set: Set of contents or texts classified into a given latent topic with some probability of belonging.

Rough sets theory: Theory as the basis for analyzing a decision table involving uncertainty due to indiscernibility.

Crisp-rough sets theory: One type of the rough sets theory. Technique to calculate an adequate approximation of objects by selecting attributes in the range where a set of objects can be specified at a certain level.

Fuzzy-rough sets theory: One type of the rough sets theory, which is an extension of the crisp-rough sets theory. Technique to enable handling of attributes in continuous values and description of objects by extending object attributes from nominal attributes to numeric attributes.

Recommendation engine: System module that recommends a content based on a user's preference or a user's action on the content. Recommendation engines based on various recommendation algorithms such as CF or CBF are already put into practice.

CF: Collaborative filtering. One type of recommendation algorithms. Technique that accumulates preference data of a plurality of users and makes recommendation or the like based on data related to another user having a similar preference to a given user.

CBF: Content-based filtering. One type of recommendation algorithms. Technique that makes recommendation or the like of a content based on a similarity of attribute data of a content.

Reason for recommendation: Explanation about a ground for recommendation presented to a user when a recommendation engine recommends a content.

<2. Exemplary Configuration of Information Processing Device According to One Embodiment>

An information processing device 100 according to one embodiment of the present invention, typically, is a device that has an attribute table storing attribute values for a plurality of contents and calculates an importance which indicates the degree of contribution to a specific attribute of content with respect to one or more attributes other than the specific attribute. In this embodiment, the information processing device 100 further has a recommendation function. The information processing device 100 selects a content to be recommended to a user, generates a reason for recommendation according to the calculated importance, and presents information related to the content to be recommended and the reason for recommendation to the user.

FIG. 1 is a block diagram showing a configuration of the information processing device 100 according to one embodiment of the present invention. Referring to FIG. 1, the information processing device 100 includes a storage unit 110, an analysis unit 120, a user interface (UI) control unit 130, a recommendation unit 140, an importance calculation unit 150, and an extraction unit 160. The information processing device 100 may be a content player that can play contents stored in the storage unit 110 through the UI control unit 130, for example. Alternatively, the information processing device 100 may be a content server that provides content data to a terminal device over a network through the UI control unit 130, for example. More generally, the information processing device 100 may be a device of any kind, such as a high-performance computer, a PC (Personal Computer), a digital household appliance, a game machine, an AV player or a smart phone.

[2-1. Attribute Table]

An attribute table which is held in the storage unit 110 of the information processing device 100 according to the embodiment is described firstly. The attribute table is a table that stores one or more attribute values given to a plurality of contents.

FIG. 2 is an explanatory view to explain an overview of the attribute table according to the embodiment. Referring to FIG. 2, the attribute table has broadly three types of attribute categories: basic attribute, extended attribute and evaluation attribute. The basic attribute is further classified into two types of categories: metadata and context data. Each of the basic attribute (metadata), the basic attribute (context data), the extended attribute and the evaluation attribute contains one or more attribute items (respective attributes). For each of the attribute items, an attribute value is given to each content. Hereinafter, a more specific example of attributes is described with respect to the respective categories of attributes shown in FIG. 2.

(1) Basic Attribute: Metadata

FIG. 3 is an explanatory view to explain an example of metadata as the basic attribute stored in the attribute table. Referring to FIG. 3, the metadata contains five types of attributes: "genre", "age", "mood", "keyword" and "artist". Those attributes are represented as numeric attributes in the example of FIG. 3. For example, for "genre", numeric values indicating whether each content belongs to "G1:Rock", "G2: Pop", and other genres are given as attribute values. For example, the attribute values of the content C1 for "genre" are (G1, G2, ... )=(1.0, 0.0, ... ). Further, the attribute values of the content C2 for "genre" are (G1, G2, ... )=(0.0, 1.0, ... ). Likewise, for "age", numeric values indicating whether each content belongs to "E1:'70s(1970s)", "E2:'80s(1980s)", and other ages are given as attribute values. For example, the attribute values of the content C1 for "age" are (E1, E2, ... )=(1.0, 0.0, ... ). Further, the attribute values of the content C2 for "age" are (E1, E2, ... )=(0.0, 1.0, ... ). Note that one content may belong to a plurality of "genre", "age" or the like with some weights.

"Mood" is an attribute that is given by analyzing a feature value of an audio signal of a music content with use of the technique disclosed in Japanese Unexamined Patent Application Publication No. 2007-207218, for example. For example, numeric values indicating whether each content has impression like "M1: cheerful" or "M2: enjoyable" are given to each content as attribute values for "mood". "Keyword" is an attribute that is given as a result of text analysis of a review provided from a service provider or a user in relation to each content, for example. For example, the frequency of appearance of each word such as noun or adjective contained in the review is given to each content as attribute values for "keyword". "Artist" is an attribute that is given for each person name relevant to the music content, for example. For example, numeric values indicating whether it is relevant to persons such as a composer, a lyricist, a singer or a costar are given to each content as attribute values for "artist".

It should be noted that the attributes shown in FIG. 3 may be represented not in the form of numeric attributes but in the form of nominal attributes. For example, in the form of nominal attributes, the content C1 may be represented as "genre"="G1:Rock", "age"="E1:'70s", and the content C2 may be represented as "genre"="G2:Pop", "age"="E2: '80s" ("attribute"="attribute value").

The metadata is typically data that can be given to each content in advance, independently of an action such as browsing, viewing or purchase (which is referred to hereinafter as browsing or the like) by a user, a recommendation process described later, and so on.

(2) Basic Attribute: Context

FIG. 4 is an explanatory view to explain an example of context data as the basic attribute stored in the attribute table. The context data is typically data that is given on the basis of the state of a user action on each content. Referring to FIG. 4, the context data contains two types of attributes: "time period" and "place". For example, "time period" indicates the number of times that each content is browsed or the like during "T1:10-12(o'clock)", "T2:12-14(o'clock)" and other time periods. For example, the attribute values of the content C1 for "time period" are (T1, T2, ...)=(2, 10, ...). Further, the attribute values of the content C2 for "time period" are (T1, T2, ...)=(3, 1, ...). Likewise, "place" indicates the number of times that each content is browsed or the like in "P1:Tokyo", "P2:Osaka" and other places. For example, the attribute values of the content C1 for "place" are (P1, P2,...)=(8, 4, ...). Further, the attribute values of the content C2 for "place" are (P1, P2, ...)=(0, 4, ...). Note that, in addition to the attributes illustrated in FIG. 4, the context data may contain arbitrary attributes that can be acquired in relation to a user action, such as day of week, date, country (place), user's gender or age bracket, for example. Further, instead of the geographical locations like "Tokyo" or "Osaka" illustrated in FIG. 4, attribute values about "place" like "home", "office" or "in car" may be contained in the context data.

(3) Extended Attribute

FIG. 5 is an explanatory view to explain an overview of the extended attribute stored in the attribute table. The extended attribute is an attribute that can be obtained by analyzing the attribute value of the basic attribute given to each content. In this embodiment, the attribute table has the extended attribute that is divided into two layers: review layer and person layer. The review layer indicates a probability of belonging of each content with respect to each latent topic $X1, \ldots, Xm$, which is obtained by analyzing the attribute value of the basic attribute "keyword" according to the probabilistic classification. On the other hand, the person layer indicates a probability of belonging of each content with respect to each latent topic $Y1, \ldots, Ym$, which is obtained by analyzing the attribute value of the basic attribute "artist" according to the probabilistic classification.

Figure 6:
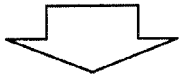
FIG. 6 is an explanatory view to explain a specific example of the extended attributes shown in FIG. 5.

FIG. 6 is an explanatory view to explain a specific example of the extended attribute shown in FIG. 5. The upper part of FIG. 6 shows attribute values (frequencies that each keyword appears in a review) of keywords (K1, K2, K3, K4, K5, ...) for each of the contents C1, C2 and C3. The keywords K1, K2, K3, K4 and K5 are "scandal", "album", "popularity", "record" and "ability", respectively. For the content C1, the keywords (K1, K2, K3, K4, K5, ...)=(1, 0, 2, 0, 1, ...). For the content C2, the keywords (K1, K2, K3, K4, K5, ...)=(0, 1, 0, 2, 1, ...). For the content C3, the keywords (K1, K2, K3, K4, K5, ...)=(3, 0, 1, 1, 0, ...). According to the probabilistic classification which is modeled by PLSA or LDA, those keywords appear in a review of each content depending on contribution of the latent topic to which each content potentially belongs. Conversely, if the attribute values of the keywords (K1, K2, K3, K4, K5, ...) are analyzed according to the probabilistic classification by PLSA or LDA, the probability of belonging of each content with respect to each latent topic can be obtained.

Specifically, when a probability of occurrence of a keyword w in a review d of each content is p(w|d), the probability of occurrence p(w|d) is represented by the following Equation (1).

$$p(w|d) = \sum_i p(w|x_i) \cdot p(x_i|d) \qquad \text{Equation (1)}$$

In Equation (1), $x_i$ is a latent topic, $p(w|x_i)$ is a probability of occurrence of a word w about the latent topic $x_i$, and $p(x_i|d)$ is a topic distribution of each content (i.e. of a review d). Note that the number of latent topics $x_i$ is set to an appropriate value (e.g. 16) in advance according to the dimension of a data space to be analyzed or the like.

The lower part of FIG. 6 shows an example of the probability of belonging with respect to each latent topic (X1, X2, ..., Xn) obtained by analyzing the attribute values of the keywords (K1, K2, K3, K4, K5, ...) according to the probabilistic classification by PLSA or LDA. For example, for the content C1, the probabilities of belonging (X1, X2, ..., Xn)=(0.4, 0.1, ..., 0.3). For the content C2, the probabilities of belonging (X1, X2, ..., Xn)=(0.1, 0.2, ..., 0.1). For the content C3, the probabilities of belonging (X1, X2, ..., Xn)=(0.6, 0.1, ..., 0.1). In this embodiment, the probabilities of belonging of the respective contents with respect to each latent topic are stored in the attribute table as attribute values of one layer of the extended attribute. Note that, in the case of calculating the extended attributes according to the probabilistic classification, it is suitable to apply the probabilistic classification after normalizing the attribute values of the basic attributes within the range of one attribute item (e.g. each keyword) (after setting the maximum value to 1).

(4) Evaluation Attribute

Figure 7:
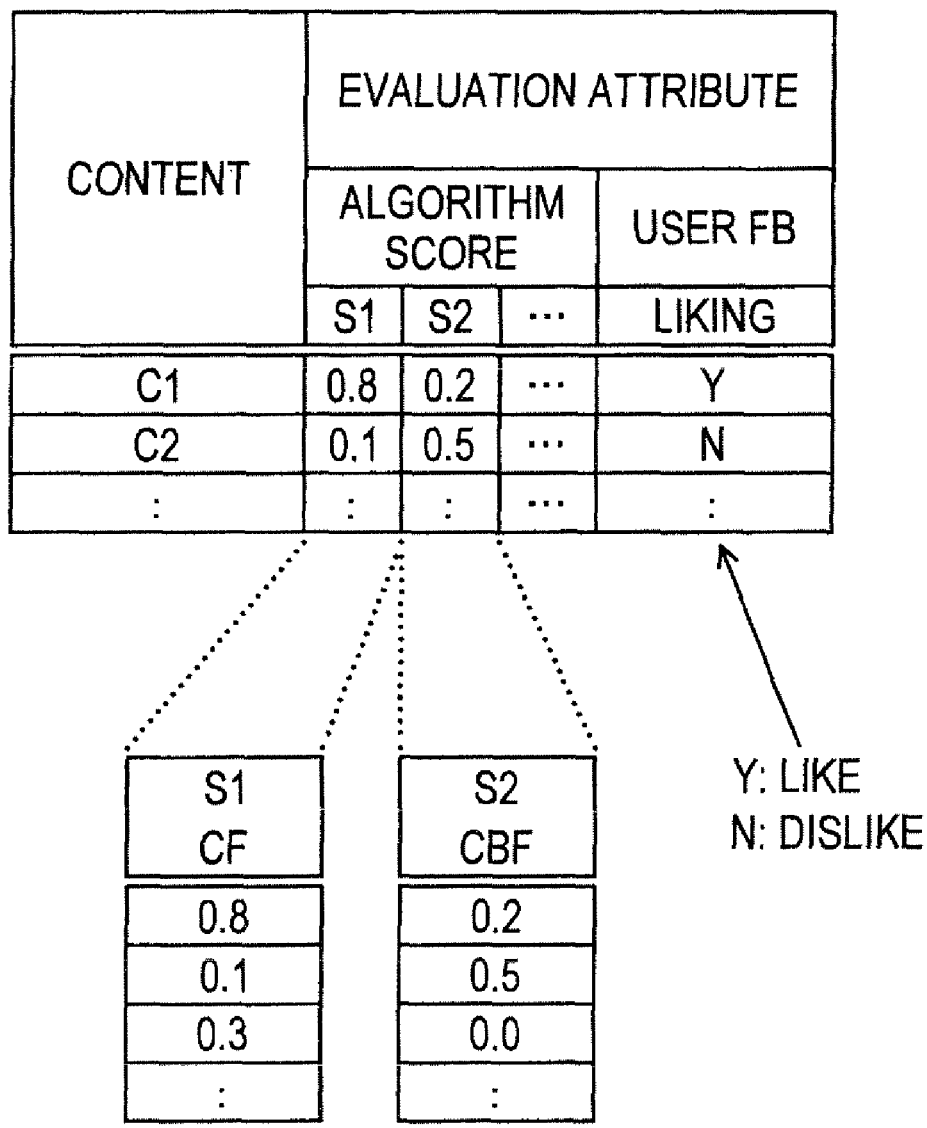
FIG. 7 is an explanatory view to explain an example of evaluation attributes stored in the attribute table.

FIG. 7 is an explanatory view to explain an example of the evaluation attribute stored in the attribute table. The evaluation attribute is typically an attribute that indicates an evaluation by a recommendation engine or a user for each content. Referring to FIG. 7, the evaluation attribute is classified into two types of categories: algorithm score and user feedback (FB).

The algorithm score includes scores S1, S2, ... for each content which are calculated by one or more recommendation algorithms. For example, the score S1 may be a score calculated by CF (collaborative filtering), and the score S2 may be a score calculated by CBF (content-based filtering). In this case, the score S1 for the content C1 corresponds to a similarity between a user preference of a user for whom recommendation is to be made and a user preference of another user who has browsed or the like the content C1, for example. Further, the score S2 for the content C1 corresponds to a similarity between metadata of the content browsed or the like by a user for whom recommendation is to be made and metadata of the content C1, for example.

On the other hand, the user FB contains attribute values given on the basis of feedback from a user or each content. The attribute values of the user FB indicate binary data of "Y: like" or "N: dislike", the score in multi-level (e.g. five-level) evaluation or the like. Alternatively, the user feedback may indicate the number of actions like browsing or the like by a user, for example.

Hereinafter, operations of the respective components of the information processing device 100 shown in FIG. 1 are described sequentially.

[2-2. Storage Unit]

The storage unit 110 is configured using a storage medium such as hard disk or semiconductor memory and has the attribute table described above with reference to FIGS. 2 to 8. The attribute table stores the attribute values of the respective attribute items of the basic attribute, the extended attribute and the evaluation attribute described above. Then, the storage unit 110 inputs and outputs those attribute values with each component of the information processing device 100. The storage unit 110 may further store actual content data. For example, when the information processing device 100 is a music player, audio data of music contents may be stored in the storage unit 110.

[2-3. Analysis Unit]

The analysis unit 120 calculates attribute values of the extended attributes based on attribute values of the basic attributes in the attribute table according to the probabilistic classification by PLSA or LDA. For example, the analysis unit 120 calculates attribute values of the review layer of the extended attribute by analyzing the attribute value related to the keyword among the attribute values of the basic attributes according to the probabilistic classification. Specifically, the attribute values of the review layer of the extended attribute may be the topic distribution of each content which derives the attribute values (frequencies of appearance) related to the keyword by the sum of products with the probability of occurrence of the keyword with respect to each latent topic, for example (cf. Equation (1)). Further, the analysis unit 120 calculates attribute values of the person layer of the extended attribute by analyzing the attribute value related to the artist among the attribute values of the basic attributes according to the probabilistic classification. Then, the analysis unit 120 stores the calculated attribute values of the extended attributes into the attribute table. The analysis according to the probabilistic classification by the analysis unit 120 can be executed when a certain number of contents are accumulated in a database (e.g. the storage unit 110) of contents or on a regular basis like every month or every year.

Note that the PLSA is described in detail in Thomas Hofman, "Probabilistic latent semantic indexing", 1999, Proceedings of the 22nd annual international ACM SIGIR conference on Research and development in information retrieval. Further, the LDA is described in detail in David M. Blei, Andrew Y. Ng, and Michael I. Jordan, "Latent Dirichlet Allocation", 2003, Journal of Machine Learning Research, Volume 3.

[2-4. User Interface Control Unit]

The UI control unit 130 controls a user interface between the information processing device 100 and a user. The user interface typically includes a screen interface displayed by a display device and an input interface such as a mouse, keyboard, touch panel or keypad. The user interface may further include a content reproducing interface such as an audio output circuit or a video output circuit. The user interface may be mounted on the information processing device 100, for example, or mounted on a terminal device connected to the information processing device 100 through a network.

To be more specific, in response to an action by a user for a certain content, for example, the UI control unit 130 updates context data for the content. Specifically, assume that a user browses the content C1 at 11 am in Tokyo, for example. In this case, the UI control unit 130 updates the attribute values of the time period "T1:10-12(o'clock)" and the place "P1:Tokyo" for the content C1. The UI control unit 130 can recognize the place where the content is browsed by a user based on the IP address of the terminal device or by means of GPS (Global Positioning System), for example.

Further, the UI control unit 130 acquires the value of the user feedback illustrated in FIG. 7 for a certain content through the input interface and stores the acquired value into the attribute table, for example. Furthermore, the UT control unit 130 controls a display device to display a recommendation screen generated by the recommendation unit 140, which is described later, for example.

In addition, when the information processing device 100 or the terminal device is provided with a sensor for detecting the state of a user, for example, the UI control unit 130 may store the state of a user acquired by the sensor into the attribute table as the attribute value of the context data. For example, the state of a smile of a user may be acquired by an imaging module having a smile sensor function, or the state of a pulse rate or a respiration rate of a user may be acquired by a biological sensor.

[2-5. Recommendation Unit]

The recommendation unit 140 operates as a recommendation engine that selects a content to be recommended to a user by using the attribute values stored in the attribute table held in the storage unit 110. Further, the recommendation unit 140 generates a reason for recommendation based on one or more important attributes extracted by the extraction unit 160, which is described later. Then, the recommendation unit 140 generates a recommendation screen for presenting information related to the content to be recommended and the reason for recommendation to a user and makes the generated recommendation screen displayed on the display device through the UI control unit 130.

The selection of a content by the recommendation unit 140 may be made according to any known recommendation algorithm such as the above-described CF or CBF. For example, when the recommendation unit 140 uses the CF as the recommendation algorithm, the recommendation unit 140 specifies another user having a preference similar to a user's preference. Next, the recommendation unit 140 extracts a group of contents browsed or the like by the specified other user. At this time, the recommendation unit 140 calculates scores (the goodness of fit of each content to a user, the certainty factor for recommendation etc.) for each of the extracted group of contents according to the similarity of preference, the evaluation of each content by the specified other user or the like, for example. The calculated scores for each content are stored into the attribute table. Then, the recommendation unit 140 selects the content with a relatively high score as the content to be recommended to a user.

On the other hand, when the recommendation unit 140 uses the CBF as the recommendation algorithm, for example, the recommendation unit 140 extracts a group of contents having metadata similar to that of the content browsed or the like by a user. At this time, the recommendation unit 140 calculates scores for each of the extracted group of contents according to the similarity of metadata, for example. The calculated scores for each content are stored into the attribute table. Then, the recommendation unit 140 selects the content with a relatively high score as the content to be recommended to a user.

Further, the recommendation unit 140 may select the content to be recommended to a user by using the attribute values regarding the user FB stored in the attribute table, for example. For example, among a plurality of contents, the content having a suitable attribute value regarding the user FB can be preferentially selected as the content to be recommended. Further, the content to be recommended to a user may be selected by using the attribute values regarding the context data stored in the attribute table, for example. For example, among a plurality of contents, the content having a track record of being browsed or the like more frequently during the time period of executing a recommendation process and in the place where a user for whom recommendation is to be made is located can be preferentially selected as the content to be recommended.

After selecting the content to be recommended, the recommendation unit 140 makes the importance calculation unit 150 calculate an importance to a specific attribute used for the selection of the content with respect to one or more attributes other than the specific attribute. Further, the recommendation unit 140 makes the extraction unit 160 extract one or more important attributes to be used for generating a reason for recommendation to be presented to a user. Then, the recommendation unit 140 generates a reason for recommendation by using the one or more important attributes extracted by the extraction unit 160, and outputs a recommendation screen that displays information related to the content to be recommended and the reason for recommendation to the UI control unit 130.

[2-6. Importance Calculation Unit]

The importance calculation unit 150 calculates an importance to a specific attribute of content with respect to one or more attributes other than the specific attribute of content by using the attribute values stored in the attribute table. Particularly, in this embodiment, the importance calculation unit 150 calculates the importance to the one or more attributes by using a decision table with the specific attribute as a decision attribute and the one or more attributes as condition attributes. For example, as described below, the importance calculation unit 150 may calculate the importance based on the number of contents which form a positive region of the decision attribute for the above-described decision table. The positive region of the decision attribute in the decision table can be derived according to the rough sets theory.

(1) Concepts Involved in Decision Table

Figure 8:
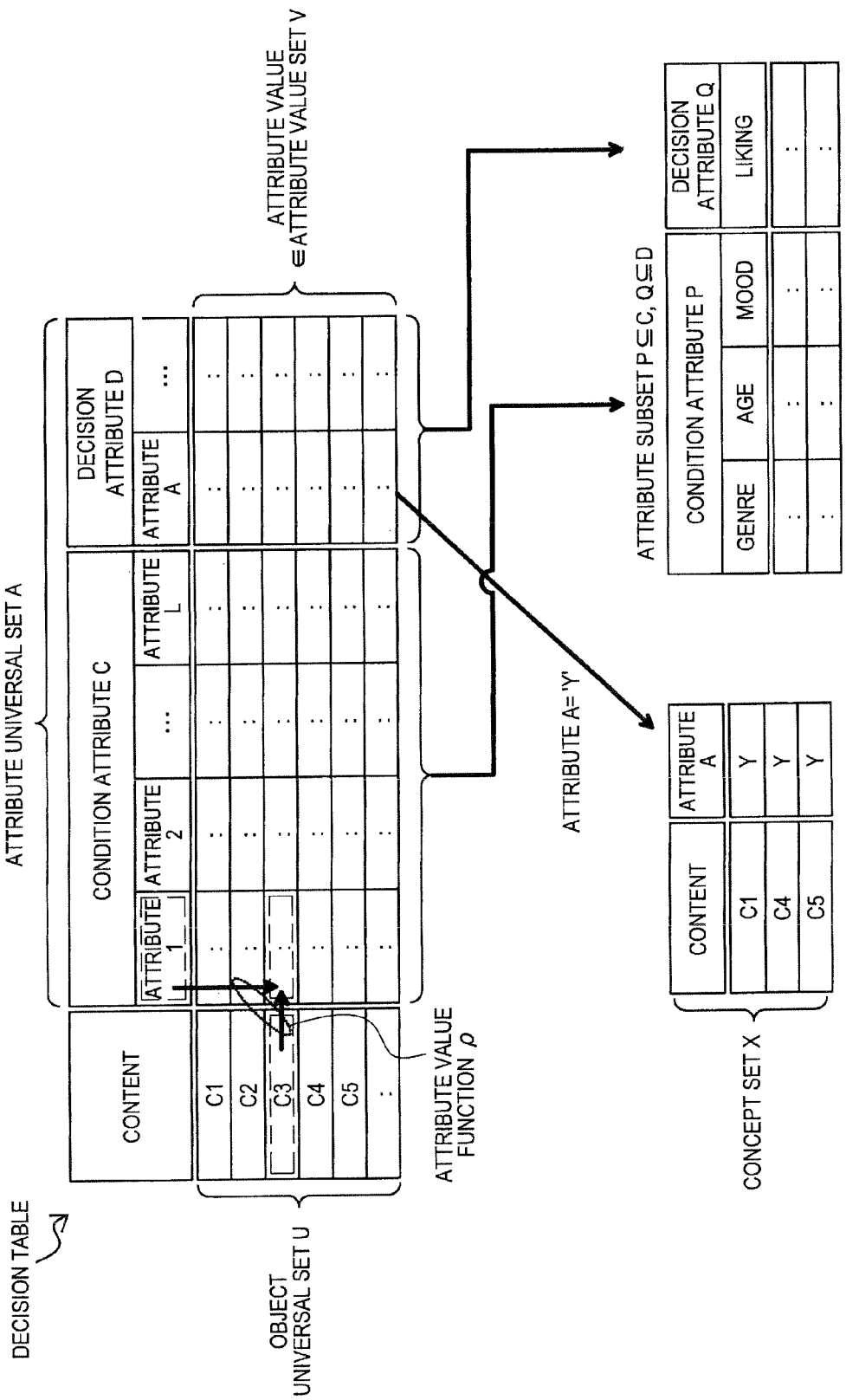
FIG. 8 is an explanatory view to explain concepts involved in a decision table.

FIG. 8 is an explanatory view to explain concepts involved in the decision table to which the rough sets theory is applied. The upper part of FIG. 8 shows a basic structure of the decision table. The decision table illustrated in FIG. 8 is a two-dimensional table with an object universal set U along the vertical axis and an attribute universal set A along the horizontal axis. The object universal set U is a set of contents. On the other hand, the attribute universal set A is a set of attribute items. The attribute universal set A is a union of the condition attribute C and the decision attribute D. The condition attribute C and the decision attribute D both contain one or more attributes. An attribute value set V is a set of attribute values of nominal attributes which each attribute contained in the attribute universal set A can have. For example, when the attributes "genre" and "age" illustrated in FIG. 3 are members of the attribute universal set A, V={{Rock, Jazz, . . . }, {'70s, '80s, . . . }}. An attribute value function $\rho$ is a function which specifies an attribute value when one member (content) of the object universal set U and one member (attribute) of the attribute universal set A are given ($\rho: U \times A \to V$).

The lower left part of FIG. 8 shows a concept set X. The concept set X is a set of contents which belong to the concept when an attribute value of a specific attribute is regarded as one concept. For example, when an attribute A can have a binary attribute value of "Y" or "N", the concept set X for the concept of the attribute A="Y" includes a content with the attribute A="Y" as an element.

The lower right part of FIG. 8 shows attribute subsets P ($P \subset C$) and Q ($Q \subset D$). The attribute subset P is a set of condition attributes to be used for calculation of an importance among the condition attributes C. On the other hand, the attribute subset Q is a set of decision attributes to be used for calculation of an importance among the decision attributes C.

(2) Definitional Equations Related to Crisp-Rough Sets

Table 1 shows definitional expressions related to the crisp-rough sets, which are described using the concepts involved in the decision table described above.

TABLE 1

| Item | Definitional Equation related to Crisp-Rough Sets |
| --- | --- |
| | Equation |
| P-equivalence relation | $IND(P) = \{x \in U, y \in U \mid \forall a \in P, a(x) = a(y)\}$ |
| P-equivalence class | $[x]_P = \{y \in U \mid (x, y) \in IND(P)\}$ |
| U division by P-equivalence class | $U/P = \Sigma \{a \in P \mid U/IND(a)\}$ |
| P-upper approximation of concept X | $P'X = \{x \in U \mid [x]_P \cap X \neq \phi\}$ |
| | $= \{x \in U \mid \exists y((x, y) \in IND(P) \land (y \in X))\}$ |
| P-lower approximation of concept X | $P''X = \{x \in U \mid [x]_P \subseteq X\}$ |
| | $= \{x \in U \mid \forall y((x, y) \in IND(P) \to (y \in X))\}$ |
| U division by Q-equivalence class | $U/Q, \bigcup_{x \in U} [x]_Q = U$ |
| Positive region in P, Q | $POS_P(Q) = \bigcup_{x \in U/Q} P''X$ |

Figure 9:
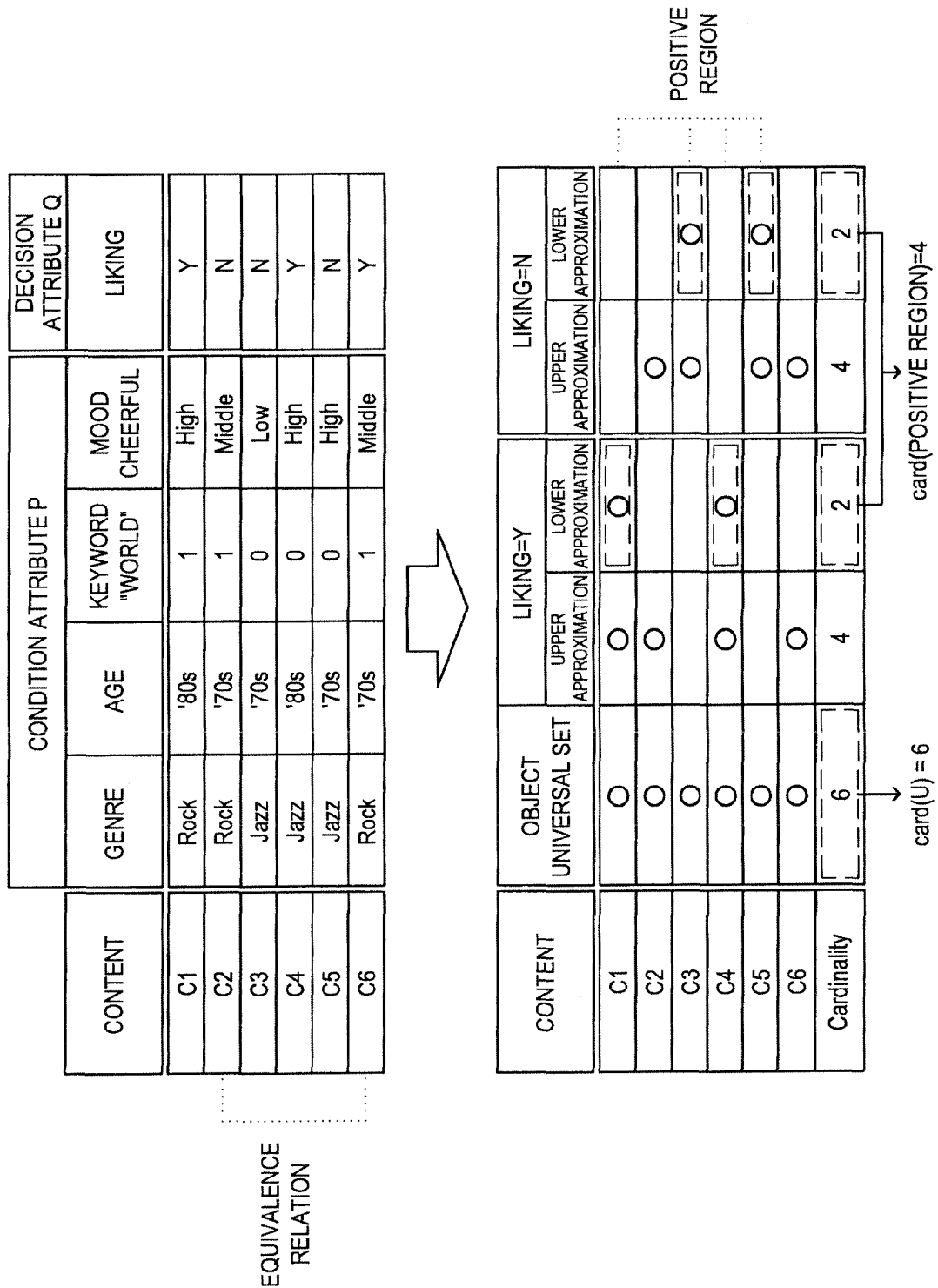
FIG. 9 is an explanatory view to explain calculation of importances based on the decision table.

The respective items in Table 1 are described hereinafter with reference to FIG. 9. The upper part of FIG. 9 shows an example of the decision table in which the contents C1 to C6 are included in the object universal set U. The attribute subset P of condition attributes in the decision table of FIG. 9 includes metadata "genre", "age", "keyword("world")" and "mood("cheerful")" among the basic attributes. For simplification of description, it is assumed that "genre", "age", and "mood("cheerful")" are represented in the form of nominal attributes. The attribute subset Q of decision attributes includes user FB "liking" among the evaluation attributes.

In Table 1, the equation of the P-equivalence relation indicates a condition that a content x and a content y which belong to the object universal set U have an equivalence relation in the attribute subset P of condition attributes. For example, in the decision table of FIG. 9, the attribute values of the condition attributes of the content C2 and the attribute values of the condition attributes of the content C6 are equal, so that the content C2 and the content C6 have an equivalence relation.

The P-equivalence class indicates a set of contents having an equivalence relation with a certain content x in the attribute subset P of condition attributes. In the decision table of FIG. 9, the content C2 and the content C6 form one P-equivalence class.

The U Division by P-equivalence class indicates that the object universal set U can be divided into subsets of P-equivalence classes. In the decision table of FIG. 9, the object universal set U can be divided into five subsets {C1}, {C2, C6}, {C3}, {C4} and {C5}.

The P-upper approximation of concept X indicates a set of contents which are determined to be likely to be included in the concept set X based on the attribute values for the attribute subset P of condition attributes. In the decision table of FIG. 9, the contents which are likely to be included in the concept set X of "liking"="Y" of the decision attribute Q are the contents C1, C2, C4 and C6. Thus, the upper approximation of the concept "liking"="Y" is a set {C1, C2, C4, C6}. Note that the content C2 is included in the upper approximation because "liking" of the content C6 in an equivalence relation with the content C2 is "Y".

The P-lower approximation of concept X indicates a set of contents which are determined to be necessarily included in the concept set X based on the attribute values for the attribute subset P of condition attributes. In the decision table of FIG. 9, the contents which are determined to be necessarily included in the concept set X of "liking"="Y" of the decision attribute Q are the contents C1 and C4. Thus, the lower approximation of the concept "liking"="Y" is a set {C1, C4}.

Note that the content C6 is not included in the lower approximation because "liking" of the content C2 in an equivalence relation with the content C6 is "N".

The U Division by Q-equivalence class indicates that the object universal set U can be divided into subsets of Q-equivalence classes. In the decision table of FIG. 9, the object universal set U can be divided into two subsets {C1, C4, C6} and {C2, C3, C5}, which respectively form the equivalence classes of the decision attribute Q.

The positive region in P,Q indicates a union of the entire equivalence classes of the P-lower approximation for the equivalence class of the decision attribute Q. In the decision table of FIG. 9, the lower approximation of the concept "liking"="Y" is a set {C1, C4}. The lower approximation of the concept "liking"="N" is a set {C3, C5}. Thus, the positive region in the condition attribute P, the decision attribute Q in the decision table of FIG. 9 is the set {{C1, C4}, {C3, C5}}.

(3) Definitional Equations Related to Fuzzy-Rough Sets

Table 2 shows definitional expressions related to the fuzzy-rough sets for the concepts involved in the decision table described above. Use of the fuzzy-rough sets instead of the crisp-rough sets enables handling of an approximation set concerning numeric attributes, not only an approximation set concerning nominal attributes. For example, in Table 2, a fuzzy equivalence class $\mu_{Fi}(x)$ (a membership value of an attribute $F_i$ in an object x) is represented as continuous values of 0.0 to 1.0.

TABLE 2

| Definitional Equation related to Fuzzy-Rough Sets | |
|---|---|
| Item | Equation |
| Fuzzy similarity relation | $\mu_{[x]_s}(y) = \mu_s(x, y)$ |
| Fuzzy equivalence class | $F_i : \mu_{F_i}(x)$ |
| U fuzzy division by fuzzy equivalence class | $F_i = \{A\} \Rightarrow U/P = \{A1, A2, A3\}$ |
| Fuzzy set of concept X for object x | $\mu_X(y)$ |
| Fuzzy P-upper approximation of concept X for fuzzy equivalence class $F_i$ | $\mu_{P'X}(F_i) = \exists\, x\{\mu_{F_i}(x) \wedge \mu_X(x)\}$ $= \sup_x \min(\mu_{F_i}(x), \mu_X(x))$ |
| Fuzzy P-lower approximation of concept X for fuzzy equivalence class $F_i$ | $\mu_{P''X}(F_i) = \forall\, x\{\mu_{F_i}(x) \to \mu_X(x)\}$ $= \inf_x \max\{(1 - \mu_{F_i}(x)), \mu_X(x)\}$ |
| Fuzzy P-upper approximation of concept X for object x | $\mu_{P'X}(x) = \sup_{F \in U/P} \min(\mu_F(x), \mu_{P'X}(F))$ $= \sup_{F \in U/P} \min\left(\mu_F(x), \sup_{y \in U} \min\{\mu_F(y), \mu_X(y)\}\right)$ |
| Fuzzy P-lower approximation of concept X for object x | $\mu_{P''X}(x) = \sup_{F \in U/P} \min(\mu_F(x), \mu_{P''X}(F))$ $= \sup_{F \in U/P} \min\left(\mu_F(x), \inf_{y \in U} \max\{(1 - \mu_F(y)), \mu_X(y)\}\right)$ |
| U fuzzy division by Q-fuzzy equivalence class | $U/Q = \{X, Y, Z\}$ |
| Fuzzy positive region in P, Q for object x | $\mu_{POS_P(Q)}(x) = \sup_{X \in U/Q} \mu_{P''X}(x)$ |

Note that the fuzzy-rough sets theory is described in detail in Richard Jensen and Qiang Shen, "Fuzzy-Rough Data Reduction with Ant Colony Optimization", Fuzzy Sets and Systems, vol. 149, no. 1, pp. 5-20, 2005, and thus not described herein.

(4) Importance Calculation Equation

An importance calculation equation for the crisp-rough sets by the importance calculation unit 150 is represented by the following Equation (2). $\gamma_P(Q)$ is an importance of the condition attribute (set) P with respect to the decision attribute (set) Q.

$$\gamma_P(Q) = \frac{\text{card}(POS_P(Q))}{\text{card}(U)} \quad \text{Equation (2)}$$

In Equation (2), card(K) indicates a cardinality of a set K, which is the number of members included in the set K. Specifically, the denominator of the right-hand side indicates a cardinality of the object universal set U. The numerator of the right-hand side indicates a cardinality of a positive region for the condition attribute (set) P, the decision attribute (set) Q.

In the example of FIG. 9, the cardinality of the object universal set U is the number of contents C1 to C6, which is six. The cardinality of the positive region for the condition attribute (set) P, the decision attribute (set) Q corresponds to the sum of the cardinality (=2) of the lower approximation of "liking"="Y" and the cardinality (=2) of the lower approximation of "liking"="N", so that 2+2=4. Thus, according to Equation (2), an importance of a combination of the condition attributes "genre", "age", "keyword("world")" and "mood ("cheerful")" with respect to the decision attribute ("liking") is calculated as 4/6=0.67.

Generally, the cardinality of the positive region is higher when the attribute values of the selected condition attributes contribute to decision of the attribute value of the decision attribute more largely, which is, when the attribute value of the decision attribute can be predicted with higher accuracy with the given attribute values of the condition attributes. On the contrary, when the attribute value of the decision attribute is not determined with a certain degree of accuracy (or necessity) with the given attribute values of the condition attributes, the cardinality of the positive region is low. This means that the cardinality of the positive region normalized like Equation (2) using the cardinality of the object universal set U can be treated as an indicator of informativity (or an indicator of quality of approximation) of an arbitrarily selected combination of condition attributes (the attribute subset P of condition attributes) with respect to the attribute value of the decision attribute (the attribute subset Q of decision attribute). Accordingly, if an importance is calculated for each combination by using the evaluation attribute contained in the attribute table as decision attribute and an arbitrary combination of other attributes as condition attributes, for example, it is possible to numerically evaluate by what combination of attributes the score or user FB to be the basis for recommendation of a content can be significantly decided or predicted.

An importance calculation equation for the fuzzy-rough sets by the importance calculation unit 150 is represented by the following Equation (3). An importance calculated according to Equation (3) can be also treated as an index of informativity of an arbitrarily selected combination of condition attributes (the attribute subset P of condition attributes) with respect to the attribute value of the decision attribute (the attribute subset Q of decision attribute).

$$\gamma_P(Q) = \frac{\sum_{x \in U} \mu_{POS_P(Q)}(x)}{\text{card}(U)} \quad \text{Equation (3)}$$

The importance calculation unit 150 calculates an importance to the decision attribute Q with respect to various combinations of condition attributes (which are referred to hereinafter as condition attribute sets) according to Equation (2) or (3).

FIG. 10 is an explanatory view to explain an example of importances for various condition attribute sets which are calculated based on the decision table illustrated in the upper part of FIG. 9, FIG. 10 shows fifteen different condition attribute sets AS1 to AS15 selectable from the condition attributes C including four members of "genre", "age", "keyword("world")" and "mood("cheerful")" (a part of which is omitted). For example, the condition attribute set AS1 includes "genre" only. The condition attribute set AS2 includes "age" only. Further, the condition attribute set AS5 includes "genre" and "age". The condition attribute set AS15 includes all of "genre", "age", "keyword("world")" and "mood("cheerful")".

The importance calculation unit 150 calculates an importance for each condition attribute set according to Equation (2) or (3), using one attribute ("liking" in the example of FIG. 10) as decision attribute, and the respective condition attribute sets AS1 to AS15 as the attribute subsets of condition attributes, for example. Assume that, as a result, the importance of the condition attribute set AS7, for example, has the highest value. In the example of FIG. 10, the importance of the condition attribute set AS7 is 0.55. In this case, it can be considered that a combination of "genre" and "mood("cheerful")" included in the condition attribute set AS7 is the attributes most significant for deciding or predicting the attribute value of the decision attribute "liking".

The importance calculation unit 150 outputs the calculation result of the importance for each condition attribute set to the extraction unit 160.

[2-7. Extraction Unit]

The extraction unit 160 extracts one or more important attributes to be used for generating information related to a content and to be presented to a user according to the above-described importance calculated by the importance calculation unit 150. The information related to a content and to be presented to a user may be a reason for recommendation or the like which is presented together with information related to a content to be recommended. Alternatively, the information related to a content and to be presented to a user may be a title of a content list (e.g. a playlist listing music contents etc.). As an extraction process of the important attributes by the extraction unit 160, there are mainly two different patterns: (1) direct extraction and (2) stepwise extraction.

(1) Direct Extraction

In the case of direct extraction, the extraction unit 160 uses, for extraction of important attributes, the importance calculated by the importance calculation unit 150 using an attribute which serves as the basis for recommendation of a content as decision attribute and one or more attributes which can be used for generation of a reason for recommendation as condition attributes.

For example, assume the case that, when the recommendation unit 140 selects a content to be recommended using the attribute values regarding user FB, generates a reason for recommendation using metadata of the content. In this case, as illustrated in FIG. 10, for example, the importance calculation unit 150 calculates an importance using user FB ("liking") as decision attribute with respect to various combinations (condition attribute sets) of attributes of metadata ("genre", "age" etc.) of the content. Then, the extraction unit 160 extracts one or more attributes included in the condition attribute set with the highest calculated importance as the important attributes, for example. Specifically, "genre" and "mood("cheerful")" can be extracted as the important attributes in the example of FIG. 10.

Figure 11:
FIG. 11 is an explanatory view to explain another example of importances calculated based on the decision table.

FIG. 11 is an explanatory view to explain another example of importances calculated based on the decision table. In relation to the example of FIG. 11, assume the situation where a content having a track record of being browsed or the like more frequently during the time period (e.g. T1) of executing a recommendation process can be selected as the content to be recommended, for example. In this case, the importance calculation unit 150 calculates an importance using context data (e.g. "time period: T1") as decision attribute with respect to various combinations (condition attribute sets) of attributes of metadata ("genre", "age" etc.) of the content, for example. Then, the extraction unit 160 extracts one or more attributes included in the condition attribute set with the highest calculated importance as the important attributes, for example. In the example of FIG. 11, because the importance of the condition attribute set AS5 including "genre" and "age" is the highest (0.65), "genre" and "age" can be extracted as the important attributes.

Note that the extraction unit 160 may extract the attributes included in one or more condition attribute sets indicating the importance exceeding a preset threshold as the important attribute, rather than extracting the attributes included in the condition attribute set with the highest calculated importance. Further, the extraction unit 160 may extract N number (N is preset) of attributes in descending order of the calculated importance as the important attributes.

(2) Stepwise Extraction

In the case of stepwise extraction, the extraction unit 160 uses, for extraction of important attributes, a first importance calculated by the importance calculation unit 150 using an attribute which serves as the basis for recommendation of a content as decision attribute and one or more attributes which are included in the extended attributes as condition attributes and a second importance calculated by the importance calculation unit 150 using the attribute which is included in the extended attributes as decision attribute and one or more attributes which can be used for generation of a reason for recommendation as condition attributes.

Figure 12:
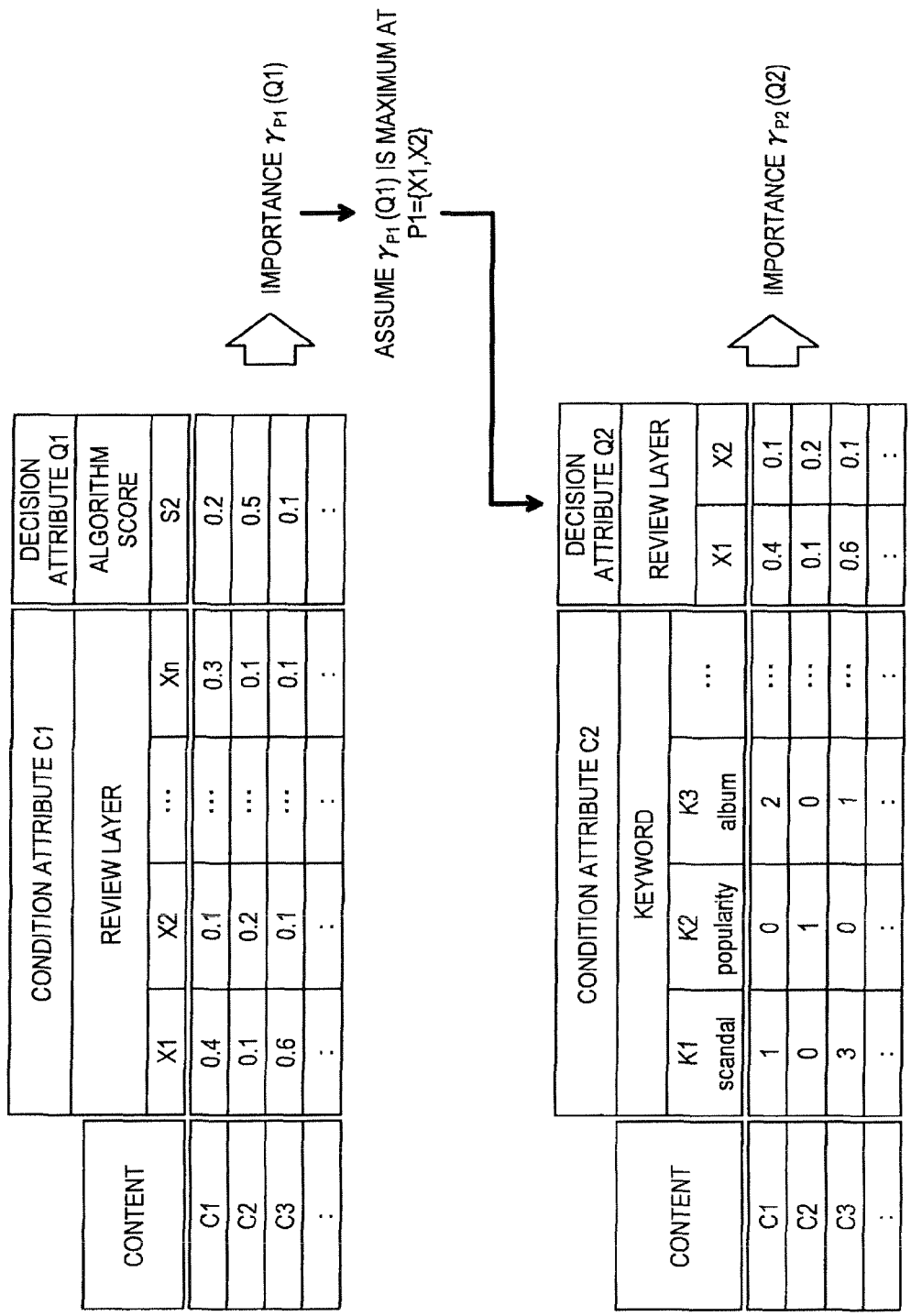
FIG. 12 is an explanatory view to explain stepwise extraction of important attributes.

FIG. 12 is an explanatory view to explain the stepwise extraction of important attributes by the extraction unit 160. In the upper part of FIG. 12, a first importance $\gamma_{P1}(Q1)(P1 \subseteq C1)$ is calculated by the importance calculation unit 150, using the score of a recommendation algorithm being the basis for recommendation of a content as decision attribute Q1, and an arbitrary combination P1 of latent topics X1 to Xn included in the review layer of the extended attribute as condition attributes. It is assumed that the first importance $\gamma_{P1}(Q1)$ is the highest when P1={X1, X2}, for example.

In the lower part of FIG. 12, a second importance $\gamma_{P2}(Q2)$ is calculated by the importance calculation unit 150, using the P1={X1, X2} as decision attribute Q2 and an arbitrary combination P2 of keywords K1, K2, K3, . . . which can be used for generation of a reason for recommendation as condition attributes. From the calculation results of the first importance and the second importance, the extraction unit 160 extracts the keyword included in the condition attribute set P2 (Q2=P1={X1, X2}) with the highest second importance $\gamma_{P2}$(Q2) as the important attribute, for example.

Note that the technique of the stepwise extraction is not limited to such an example. The technique described with reference to FIG. 12 is a technique that specifies a set of extended attributes (latent topics of the review layer) which contributes to the score of the recommendation algorithm most largely by using the first importance and then extracts a set of basic attributes (keywords) which contributes to the specified set of extended attributes by using the second importance. Alternatively, the extraction unit 160 may multiply the first importance and the second importance by a common set of extended attributes and extract the attribute included in a set of basic attributes with the larger product of multiplication as the important attribute.

Note that, regardless of the direct extraction or the stepwise extraction, a set of condition attributes and decision attributes is not limited to the above examples. The extraction unit 160 outputs the important attributes extracted in this manner to the recommendation unit 140.

[2-8. Example of Screen]

Figure 13:
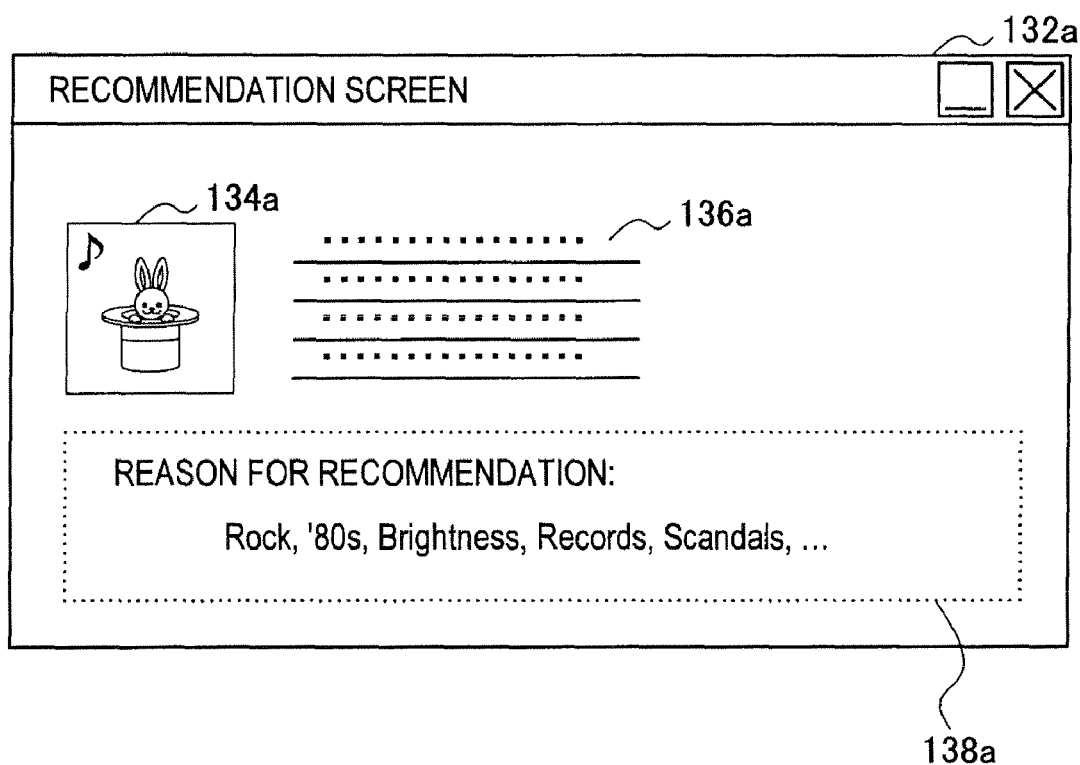
FIG. 13 is an explanatory view to explain an example of a screen on which a reason for recommendation is presented.
Figure 14:
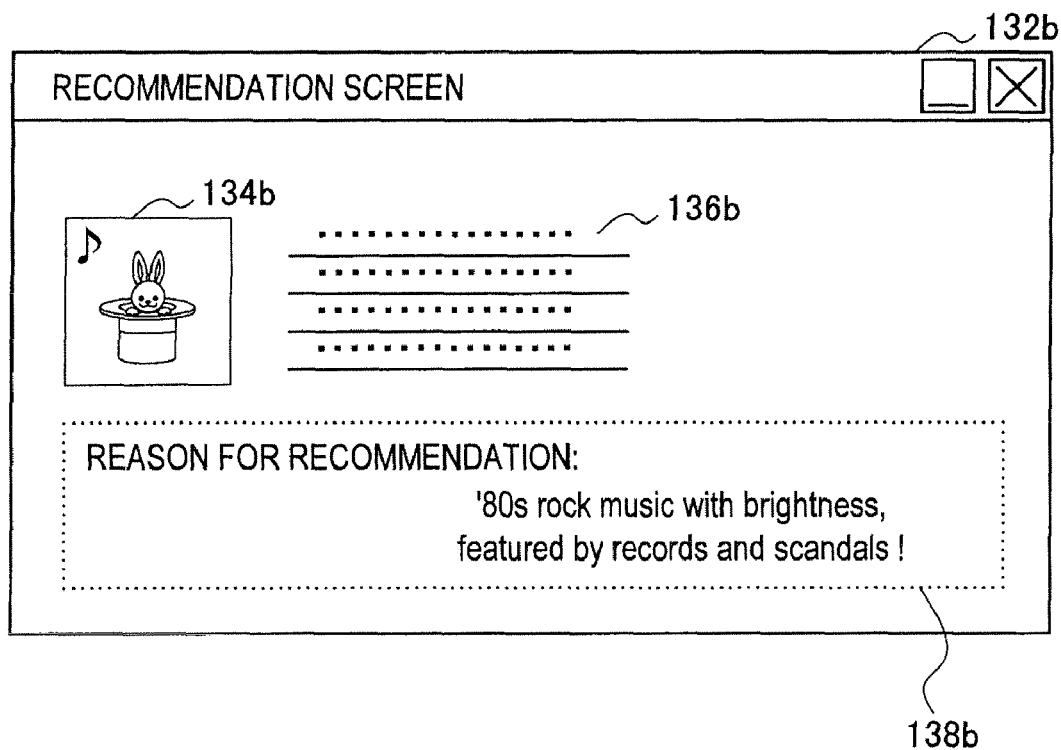
FIG. 14 is an explanatory view to explain another example of a screen on which a reason for recommendation is presented.

FIGS. 13 and 14 show examples of a screen on which a reason for recommendation is presented. FIG. 13 shows a recommendation screen 132a as an example which is generated by the recommendation unit 140 and displayed by a display device through the UI control unit 130. The recommendation screen 132a includes a jacket image 134a of a music content which is recommended to a user, a description 136a of the content, and a recommendation reason 138a. In the recommendation reason 138a, character strings representing the important attributes extracted by the extraction unit 160 are listed. By displaying the recommendation reason 138a, a user can be convinced of a reason for recommendation of the recommended content. Further, a user can more easily determine an action (browsing, purchase, ignoring etc.) on the recommended content.

FIG. 14 shows a recommendation screen 132b as another example which is generated by the recommendation unit 140 and displayed by a display device through the UI control unit 130. The recommendation screen 132b includes a jacket image 134b of a music content which is recommended to a user, a description 136b of the content, and a recommendation reason 138b. In the recommendation reason 138b, a sentence about a reason for recommendation generated using the important attributes extracted by the extraction unit 160 is shown. The recommendation reason 138b also allows a user to be convinced of a reason for recommendation of the recommended content and to determine a user's action on the recommended content more easily.

3. Flow of Process According to One Embodiment

A flow of a process by the information processing device 100 according to the embodiment is described hereinafter with reference to FIGS. 15 and 16.

[3-1. Preprocess]

Figure 15:
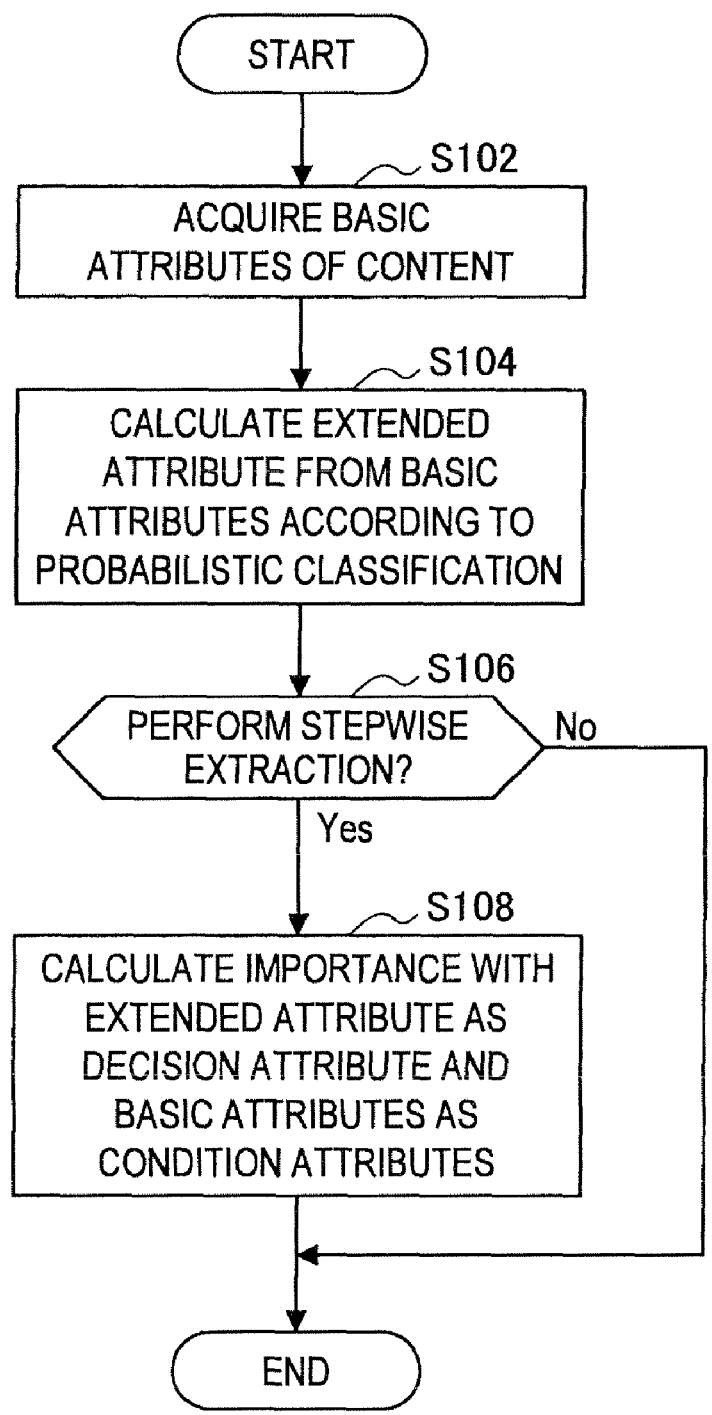
FIG. 15 is a flowchart showing an example of a flow of a preprocess by an information processing device according to one embodiment.

FIG. 15 is a flowchart showing an example of a flow of a preprocess by the information processing device 100 according to the embodiment. The preprocess is a process which can be performed prior to a recommendation process of a content. The preprocess may be executed when a certain number of contents are accumulated or on a regular basis at fixed intervals, for example.

Referring to FIG. 15, the analysis unit 120 first acquires the basic attributes of the content stored in the attribute table of the storage unit 110 (Step S102). Next, the analysis unit 120 calculates the attribute value of the extended attribute based on the attribute values of the basic attributes according to the probabilistic classification by PLSA or LDA (Step S104). The analysis unit 120 stores the calculated attribute value of the extended attribute into the attribute table.

Then, the importance calculation unit 150 determines whether the stepwise extraction of the important attribute is performed during the recommendation process by the recommendation unit 140 (step S106). When the stepwise extraction of the important attribute is not performed, the step S108 is skipped. When the stepwise extraction of the important attribute is performed, the importance calculation unit 150 calculates the importance (the second importance in the stepwise extraction) using the extended attribute calculated by the analysis unit 120 as decision attribute and the basic attributes as condition attributes (step S108). The importance calculation unit 150 stores the calculated importance into the storage unit 110 for the subsequent recommendation process, for example.

In addition to the above preprocess, when a user action such as browsing or the like of a content is performed, for example, processing such as update of the context data or registration of a user BF by the UI control unit 130 can be performed. Further, in accordance with such processing, recalculation of the extended attribute or the like may be performed.

[3-2. Recommendation Process]

Figure 16:
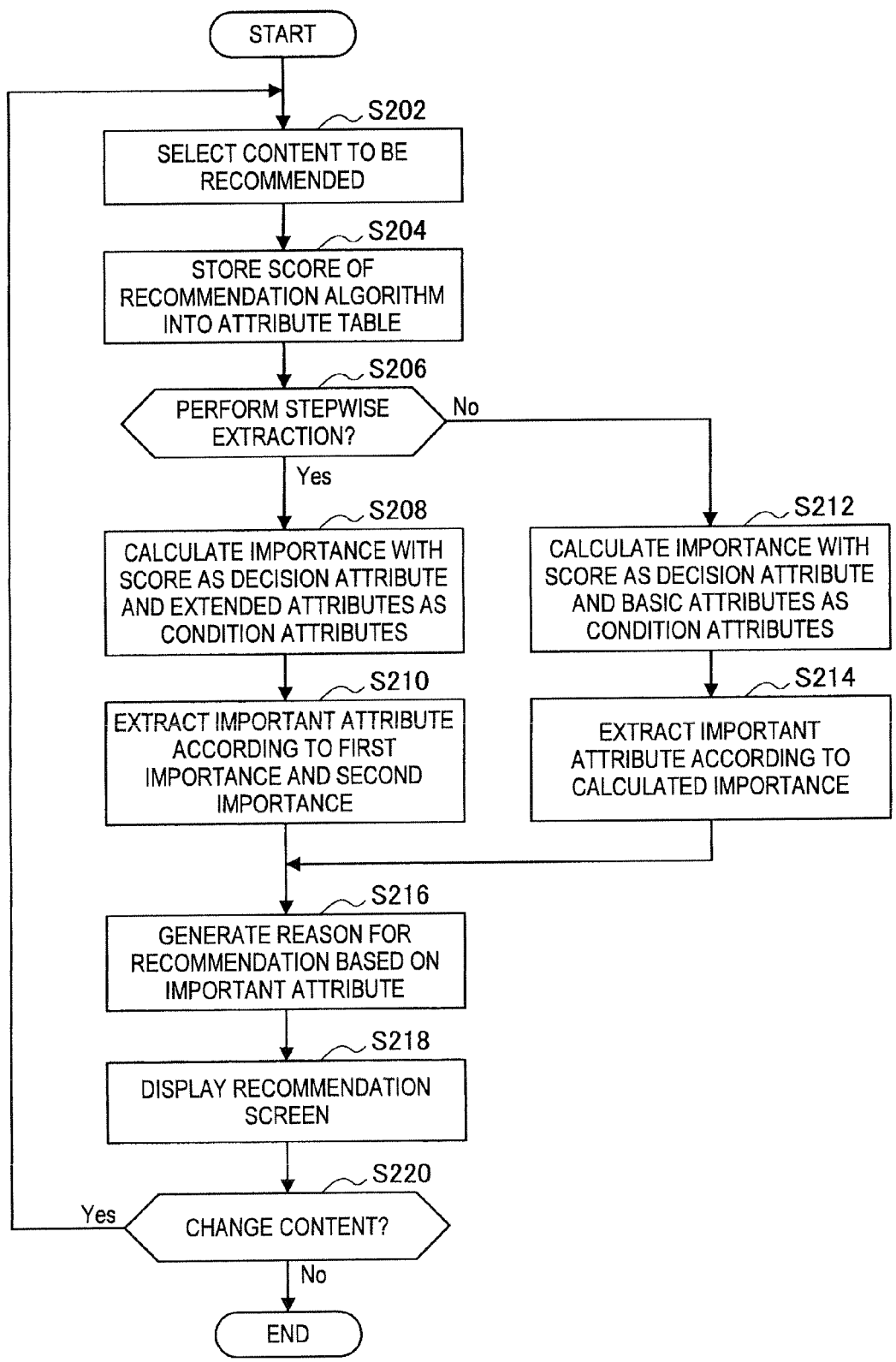
FIG. 16 is a flowchart showing an example of a flow of a recommendation process by an information processing device according to one embodiment.

FIG. 16 is a flowchart showing an example of a flow of a recommendation process by the information processing device 100 according to the embodiment. The recommendation process is a process that can be performed in response to a request from a user or a terminal device, for example.

Referring to FIG. 16, the recommendation unit 140 first selects a content to be recommended to a user by using the attribute values stored in the attribute table held in the storage unit 110 (step S202). Next, the recommendation unit 140 stores the scores output by the recommendation algorithm into the attribute table as the attribute values of the evaluation attribute (step S204). Then, the importance calculation unit 150 determines whether the stepwise extraction of the important attribute is performed (step S206). When the stepwise extraction of the important attribute is performed, the process proceeds to step S208. On the other hand, when the stepwise extraction of the important attribute is not performed, the process proceeds to step S212.

In the step S208, the importance calculation unit 150 calculates the importance (the first importance in the stepwise extraction) using the score (or another attribute such as user FB) output by the recommendation unit 140 as decision attribute and the extended attributes as condition attributes, for example (step S208). Then, the extraction unit 160 extracts the important attribute according to the first importance and the second importance (step S210).

On the other hand, in the step S212, the importance calculation unit 150 calculates the importance (the importance in the direct extraction) using the score (or another attribute such as user FB) output by the recommendation unit 140 as decision attribute and the basic attributes as condition attributes, for example (step S212). Then, the extraction unit 160 extracts the important attribute according to the importance calculated by the importance calculation unit 150 (step S214).

Then, the recommendation unit 140 generates a recommendation screen which includes a reason for recommendation to be presented to a user based on the important attribute extracted by the extraction unit 160 (step S216). The UI control unit 130 then controls the display device to display the recommendation screen generated by the recommendation unit 140 (step S218). After that, in the case of changing the content to be recommended, the process returns to the step S202, and the above-described process is repeated. On the other hand, when a new content to be recommended does not exist, the recommendation process ends.

Note that, although the case where either one of the direct extraction or the stepwise extraction of the important attribute is performed for one content is shown in the flowchart of FIG. 16, both of the direct extraction and the stepwise extraction of the important attribute may be performed for one content. For example, the information processing device 100 may perform the direct extraction for the basic attributes ("genre", "age", "mood" etc.) with a small number of members of the attribute value set and perform the stepwise extraction using the extended attributes for the basic attributes ("keyword", "artist" etc.) with a large number of members of the attribute value set. Because the dimension of the attribute space of the extended attributes is generally lower than the dimension of the attribute space of the basic attributes (typically, it corresponds to the number of latent topics), by using the extended attributes as condition attributes in between, the calculation cost of the importance calculation processing during the recommendation process can be reduced. Further, as an advantage of the probabilistic classification, a latent relationship (e.g. equivalence relationship) between keywords or artists can be reflected on the calculation result of the importance.

4. ALTERNATIVE EXAMPLES

[4-1. Provision of Playlist]

Figure 17:
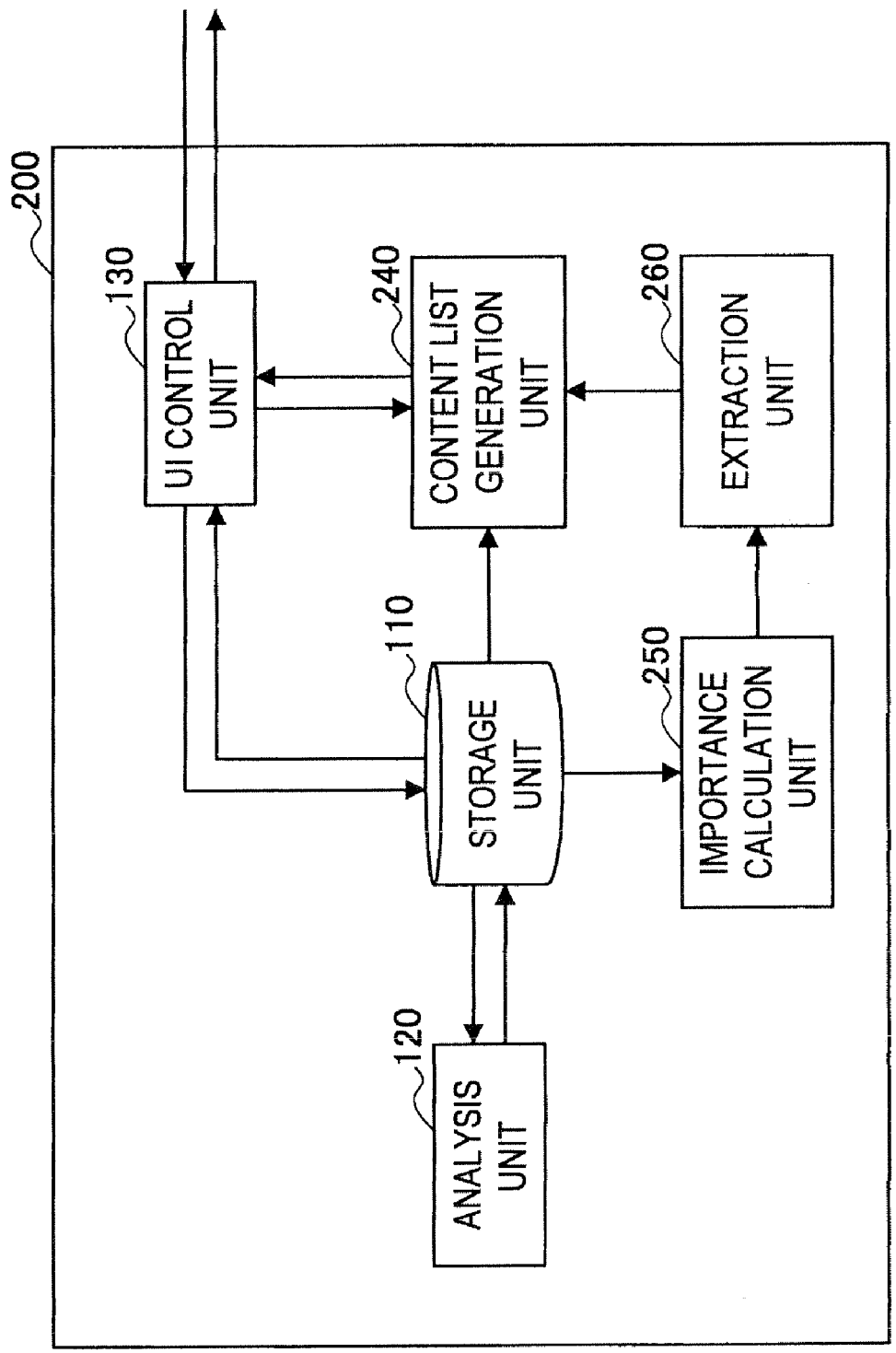
FIG. 17 is a block diagram showing a configuration of an information processing device according to one alternative example.

FIG. 17 is a block diagram showing a configuration of an information processing device 200 according to one alternative example of the embodiment. Referring to FIG. 17, the information processing device 200 includes a storage unit 110, an analysis unit 120, a user interface (UI) control unit 130, a content list generation unit 240, an importance calculation unit 250, and an extraction unit 260. The information processing device 200 includes the content list generation unit 240 in place of the recommendation unit 140 shown in FIG. 1.

The content list generation unit 240 generates a list of contents to be reproduced by the UI control unit 130 according to user designation or using the attribute values stored in the attribute table. Further, the content list generation unit 240 generates a title of the content list based on one or more important attributes extracted by the extraction unit 260. Then, the content list generation unit 240 presents the content list with the title to a user through the UI control unit 130. The content list generated by the content list generation unit 240 may be a playlist listing music contents or video contents to be played.

The content list generated by the content list generation unit 240 includes a group of contents designated by a user, for example. When contents to be included in the content list are designated by a user, the content list generation unit 240 stores the scores having the attribute values depending on the presence or absence of user designation (e.g. "1" when there is designation and "0" when there is no designation) as the evaluation attributes of the attribute table, for example. On the other hand, when the content list generation unit 240 selects contents to be included in the content list using any of the recommendation algorithms described above, the content list generation unit 240 stores the scores output by the recommendation algorithm into the attribute table.

Further, the content list generation unit 240 may select contents to be included in the content list by using the attribute values regarding the user FB stored in the attribute table, for example. Furthermore, the content list generation unit 240 may select contents to be included in the content list by using the attribute values regarding the context data stored in the attribute table, for example. For example, the content having a track record of being played more frequently during a specific time period can be preferentially selected as the content to be included in the content list.

After generating the content list, the content list generation unit 240 makes the importance calculation unit 250 calculate an importance to the specific attribute used for generation of the content list with respect to one or more attributes other than the specific attribute. Further, the content list generation unit 240 makes the extraction unit 260 extract one or more important attributes to be used for generation of a title of the content list. Then, the content list generation unit 240 generates the title of the content list by using the one or more important attributes extracted by the extraction unit 260 and presents the content list with the title to a user through the UI control unit 130.

The importance calculation unit 250 calculates an importance to a specific attribute of content with respect to one or more attributes other than the specific attribute of content by using the attribute values stored in the attribute table. For example, the importance calculation unit 250 may calculate the importance using the decision table with the evaluation attribute having the attribute value determined depending on the presence or absence of user designation as decision attribute. Further, for example, the importance calculation unit 250 may calculate the importance using the decision table with the attribute (e.g. the score of the recommendation algorithm etc.) used for generation of the content list by the content list generation unit 240 as decision attribute. The importance calculation unit 250 may output the importance calculated for each of a plurality of condition attribute sets to the extraction unit 260, in the same manner as the importance calculation unit 150 described above.

The extraction unit 260 extracts one or more important attributes to be used for generating the title of the content list according to the above-described importances calculated by the importance calculation unit 250. The extraction process of the important attributes by the extraction unit 260 can be also performed by two different patterns of the direct extraction and the stepwise extraction, in the same manner as the extraction unit 160 described above.

According to the alternative example, when the content list is generated according to user designation, for example, a combination of important attributes related to a user's intention, feeling or the like which the system is unable to know directly is extracted, and the title of the content list can be generated dynamically using the important attributes. Further, when the system generates the content list using the recommendation algorithm, for example, the title suitable for the result of recommendation can be generated dynamically. Note that the title of the content list may be a simple combination of attribute character strings such as "Rock, Scandal", for example, or may be processed so as to look much like the title.

[4-2. Personalization]

Figure 18:
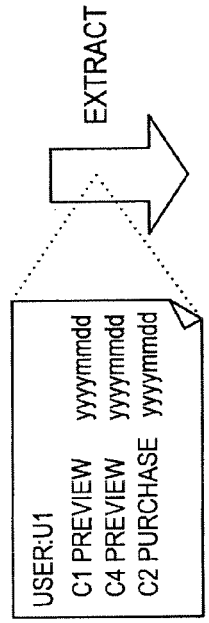
FIG. 18 is an explanatory view to explain personalization according to another alternative example.

FIG. 18 is an explanatory view to explain another alternative example of the embodiment. The upper part of FIG. 18 shows the attribute table held in the storage unit 110 shown in FIG. 1. Further, history data indicating a history of user actions on each content of a user U1 is shown below the attribute table. The history data is stored for each user (or each device) in the storage unit 110, for example. Then, the importance calculation unit 150 or 250 acquires a subset of the attribute table for the contents included in the history data and calculates the importance based only on the attribute values included in the acquired subset, for example. In the example of FIG. 18, the history data of the user U1 includes user actions on the contents C1, C4 and C2, and the subset of the attribute table for the contents C1, C4 and C2 is acquired. In such a case, the important attributes output from the extraction unit 160 or 260 are attributes which are important not for all users but for a specific user (the user U1 in the example of FIG. 18). By such filtering of the attribute table based on the history data, the importance according to the characteristics of an individual user can be calculated. This enables personalization of the reason for recommendation, the title of the playlist or the like presented by the information processing device 100 or 200, thereby improving user satisfaction.

5. Exemplary Hardware Configuration

A series of processing by the information processing device 100 or 200 described above is typically implemented using software. A program composing the software is executed using a general-purpose computer which includes the elements shown in FIG. 19, for example.

In FIG. 19, a CPU (Central Processing Unit) 902 controls entire operation of the general-purpose computer. A program or data in which a part of or an entire of the series of processes is described is stored in a ROM (Read Only Memory) 904. The program and data used by the CPU 902 when executing the process are temporarily stored in a RAM (Random Access Memory) 906.

The CPU 902, the ROM 904 and the RAM 906 are connected to each other through a bus 910. An input/output interface 912 is further connected to the bus 910.

The input/output interface 912 is the interface to connect the CPU 902, the ROM 904 and the RAM 906, and an input device 920, an output device 922, a storage device 924, a communication device 926, and a drive 930.

The input device 920 accepts instruction or information input from a user through an input means such as a mouse, a keyboard, or a touch panel, for example. The output device 922 outputs information to a user through a display device such as a CRT (Cathode Ray Tube), a liquid crystal display, or an OLED (Organic Light Emitting Diode), or an audio output device such as a speaker.

The storage device 924 is composed of hard disk or flash memory, for example, and stores the program, program data and so on. The communication device 926 performs communication processing over a network such as LAN or the Internet. The drive 930 is mounted on the general-purpose computer according to need, and a removable medium 932 is attached to the drive 930, for example.

<6. Summary>

One embodiment of the present invention and its alternative examples are described above with reference to FIGS. 1 to 19. According to the embodiment, an importance indicating the degree of contribution to a specific attribute of content is calculated with respect to one or more attributes other than the specific attribute of content by using attribute values given to a plurality of contents. The importance is calculated using a decision table with the specific attribute as a decision attribute and the one or more attributes as condition attributes. It is thereby possible to flexibly evaluate the importance for various combinations of condition attributes.

Further, according to the embodiment, the importance is calculated based on the number of contents forming a positive region of the decision attribute for the decision table according to the rough sets theory. Generally, the cardinality of the positive region of the decision table can be handled as an index of informativity of a combination of condition attributes with respect to the attribute value of the decision attribute. Thus, the importance calculated by the technique according to the embodiment is a significant index according to the informativity for each combination of condition attributes.

Further, according to the embodiment, information related to a content and to be presented to a user, e.g. a reason for recommendation or a title of a content list, is generated using the important attribute extracted according to the calculated importance. Consequently, when a combination of attributes relevant to each other has a certain meaning, the combination of attributes can be adequately reflected on the reason for recommendation, the title of the content list or the like. Further, the reason for recommendation, the title of the content list or the like can be varied adaptively according to the status (i.e. context) at the time of feedback or user action by a user.

Further, according to the embodiment, the attribute value of the extended attribute is calculated based on the attribute values of the basic attributes according to the probabilistic classification by PLSA or LDA. Then, the attribute value of the extended attribute is used in between, so that important attributes can be extracted in a stepwise fashion. This enables reduction of the possibility that the accuracy of the calculation result of the importance is degraded due to fluctuation of description of the basic attributes (e.g. keyword, person name etc.). Further, a reason for recommendation or the like can be generated based appropriately on a latent relevance between basic attributes such as a synonymous relationship.

Note that, according to the importance calculation method using the decision table described in this specification, various kinds of importances can be calculated depending on setting of the condition attributes and the decision attribute. For example, by using context data indicating the state of a user acquired by the smile sensor or the biological sensor described above as the decision table, for example, different importances can be calculated according to the state of mind or the physical condition of a user.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-037469 filed in the Japan Patent Office on Feb. 23, 2010, the entire content of which is hereby incorporated by reference.

What is claimed is:

1. An information processing device comprising:
a storage unit that has an attribute table storing attribute values of a feedback attribute based on user feedback for each of a plurality of contents;
an importance calculation unit that calculates an importance to a specific feedback attribute of content with respect to one or more attributes other than the specific feedback attribute of content using attribute values stored in the attribute table,
wherein the importance calculation unit calculates the importance using a decision table with the specific feedback attribute as a decision attribute and the one or more attributes as condition attributes;
an extraction unit that extracts one or more important attributes to be used for generating information related to the content and to be presented to a user according to the importance calculated by the importance calculation unit; and
a recommendation unit that selects a content to be recommended to a user by using attribute values of the feedback attribute stored in the attribute table and generates a reason for recommendation based on the one or more important attributes extracted by the extraction unit.

2. The information processing device according to claim 1, wherein
the importance calculation unit calculates the importance based on the number of contents forming a positive region of the decision attribute for the decision table.

3. The information processing device according to claim 1, wherein
the recommendation unit stores a score for each content calculated for selection of a content into the attribute table, and
the extraction unit extracts the one or more important attributes according to the importance calculated by the importance calculation unit using the score as decision attribute.

4. The information processing device according to claim 1, wherein
the attribute table further stores attribute values of a context attribute given based on a state of a user action for each content,
the recommendation unit selects a content to be recommended to a user by using attribute values of the context attribute, and
the extraction unit extracts the one or more important attributes according to the importance calculated by the importance calculation unit using the context attribute as decision attribute.

5. The information processing device according to claim 1, wherein
the attribute table stores attribute values of basic attributes given to a plurality of contents as well as attribute values of extended attributes obtained by analyzing attribute values of the basic attributes.

6. The information processing device according to claim 5, wherein
the extraction unit extracts the one or more important attributes according to a first importance calculated by the importance calculation unit using the specific attribute as decision attribute and one or more attributes included in the extended attributes as condition attributes and a second importance calculated by the importance calculation unit using the attribute included in the extended attributes as decision attribute and one or more attributes included in the basic attributes as condition attributes.

7. The information processing device according to claim 6, further comprising:
an analysis unit that calculates attribute values of the extended attributes based on attribute values of the basic attributes according to probabilistic classification by PLSA (Probabilistic Latent Semantic Analysis) or LDA (Latent Dirichlet Allocation).

8. The information processing device according to claim 1, further comprising:
a content list generation unit that generates a list of contents to be reproduced using attribute values stored in the attribute table and generates a title of a content list based on the one or more important attributes extracted by the extraction unit,
wherein the extraction unit extracts the one or more important attributes according to the importance calculated by the importance calculation unit using an attribute used for generation of the content list by the content list generation unit as decision attribute.

9. The information processing device according to claim 1, further comprising:
a content list generation unit that generates a list of contents to be reproduced according to user designation and generates a title of a content list based on the one or more important attributes extracted by the extraction unit,
wherein the extraction unit extracts the one or more important attributes according to the importance calculated by the importance calculation unit using an attribute having an attribute value determined depending on presence or absence of user designation as decision attribute.

10. The information processing device according to claim 1, wherein
the storage unit further contains history data indicating a history of user actions for a plurality of contents, and
the importance calculation unit calculates the importance as to the one or more attributes for each user by using attribute values of contents included in the history data.

11. The information processing device according to claim 1, wherein
the importance calculation unit derives a positive region of the decision attribute in the decision table according to a rough sets theory.

12. An importance calculation method in an information processing device having an attribute table storing attribute values of a feedback attribute based on user feedback for each of a plurality of contents using a storage medium, the method comprising a step of:
calculating an importance to a specific feedback attribute of content with respect to one or more attributes other than the specific feedback attribute of content using attribute values stored in the attribute table,
wherein the importance is calculated using a decision table with the specific feedback attribute as a decision attribute and the one or more attributes as condition attributes,
extracting one or more important attributes to be used for generating information related to the content and to be presented to a user according to the calculated importance; and
selecting a content to be recommended to a user by using attribute values of the feedback attribute stored in the attribute table and generating a reason for recommendation based on the one or more important extracted attributes.

13. A non-transitory computer-readable record medium storing a program causing a computer that controls an information processing device having an attribute table storing attribute values of a feedback attribute based on user feedback for each of a plurality of contents to function as:
an importance calculation unit that calculates an importance to a specific feedback attribute of content with respect to one or more attributes other than the specific feedback attribute of content using attribute values stored in the attribute table,
wherein the importance calculation unit calculates the importance using a decision table with the specific feedback attribute as a decision attribute and the one or more attributes as condition attributes;
an extraction unit that extracts one or more important attributes to be used for generating information related to the content and to be presented to a user according to the importance calculated by the importance calculation unit; and
a recommendation unit that selects a content to be recommended to a user by using attribute values of the feedback attribute stored in the attribute table and generates a reason for recommendation based on the one or more important attributes extracted by the extraction unit.

* * * * *